(12) United States Patent
Ichiraku et al.

(10) Patent No.: US 11,783,741 B2
(45) Date of Patent: Oct. 10, 2023

(54) LIQUID CRYSTAL DISPLAY DEVICE AND LINE DEFECT DETECTION METHOD

(71) Applicant: Shanghai Tianma Micro-Electronics Co., Ltd., Shanghai (CN)

(72) Inventors: Tsuyoshi Ichiraku, Kanagawa (JP); Yukihiro Ito, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/958,654

(22) Filed: Oct. 3, 2022

(65) Prior Publication Data

US 2023/0107585 A1 Apr. 6, 2023

(30) Foreign Application Priority Data

Oct. 4, 2021 (JP) ................................ 2021-163375

(51) Int. Cl.
*G09G 3/00* (2006.01)
*G09G 3/36* (2006.01)
(Continued)

(52) U.S. Cl.
CPC .......... *G09G 3/006* (2013.01); *G02F 1/1309* (2013.01); *G02F 1/13338* (2013.01);
(Continued)

(58) Field of Classification Search
CPC .. G09G 3/006; G09G 3/3648; G09G 2354/00; G09G 2380/10; G09G 2380/12;
(Continued)

(56) References Cited

U.S. PATENT DOCUMENTS 6,100,865 A 8/2000 Sasaki
10,971,095 B2 4/2021 Suzuki et al.
(Continued)

FOREIGN PATENT DOCUMENTS

JP 10-097203 A 4/1998
WO 2018/079636 A1 5/2018

OTHER PUBLICATIONS

Yasuaki Muto, "Evolution of in-vehicle display technology and Innovation of the cockpit system", AM-FPD 2018, Special Symposium 2-2, Panasonic Corp., 2018, 4 pages.

*Primary Examiner* — Peter D Mcloone
(74) *Attorney, Agent, or Firm* — Sughrue Mion, PLLC

(57) ABSTRACT

A liquid crystal display device includes a liquid crystal panel and a driver that drives the liquid crystal panel. The driver includes a control unit that executes a display process of displaying an image on the liquid crystal panel, a touch detection process of detecting a touch on the liquid crystal panel, and a line defect determination process of determining the presence of a line defect in the liquid crystal panel. In the line defect determination process, the control unit applies a drive signal to each sensor electrode, determines whether a detection value detected from each of the sensor electrodes when the drive signal is applied meets a predetermined determination criterion, and determines that the line defect has occurred when the sensor electrodes whose detection values meet the determination criterion among the plurality of sensor electrodes are linearly distributed.

11 Claims, 25 Drawing Sheets

(51) Int. Cl.
*G06F 3/041* (2006.01)
*G02F 1/1333* (2006.01)
*G02F 1/13* (2006.01)
*G06F 3/044* (2006.01)

(52) U.S. Cl.
CPC ............ *G06F 3/044* (2013.01); *G06F 3/0412* (2013.01); *G06F 3/04166* (2019.05); *G09G 3/3648* (2013.01); *G09G 2354/00* (2013.01); *G09G 2380/10* (2013.01); *G09G 2380/12* (2013.01)

(58) Field of Classification Search
CPC .... G06F 3/04166; G06F 3/0412; G06F 3/044; G02F 1/1309; G02F 1/13338
See application file for complete search history.

(56) References Cited

U.S. PATENT DOCUMENTS

2014/0184671 A1* 7/2014 Lee .................... G09G 3/006
 345/697
2021/0366325 A1* 11/2021 Zhang ................ G09G 3/3291

* cited by examiner

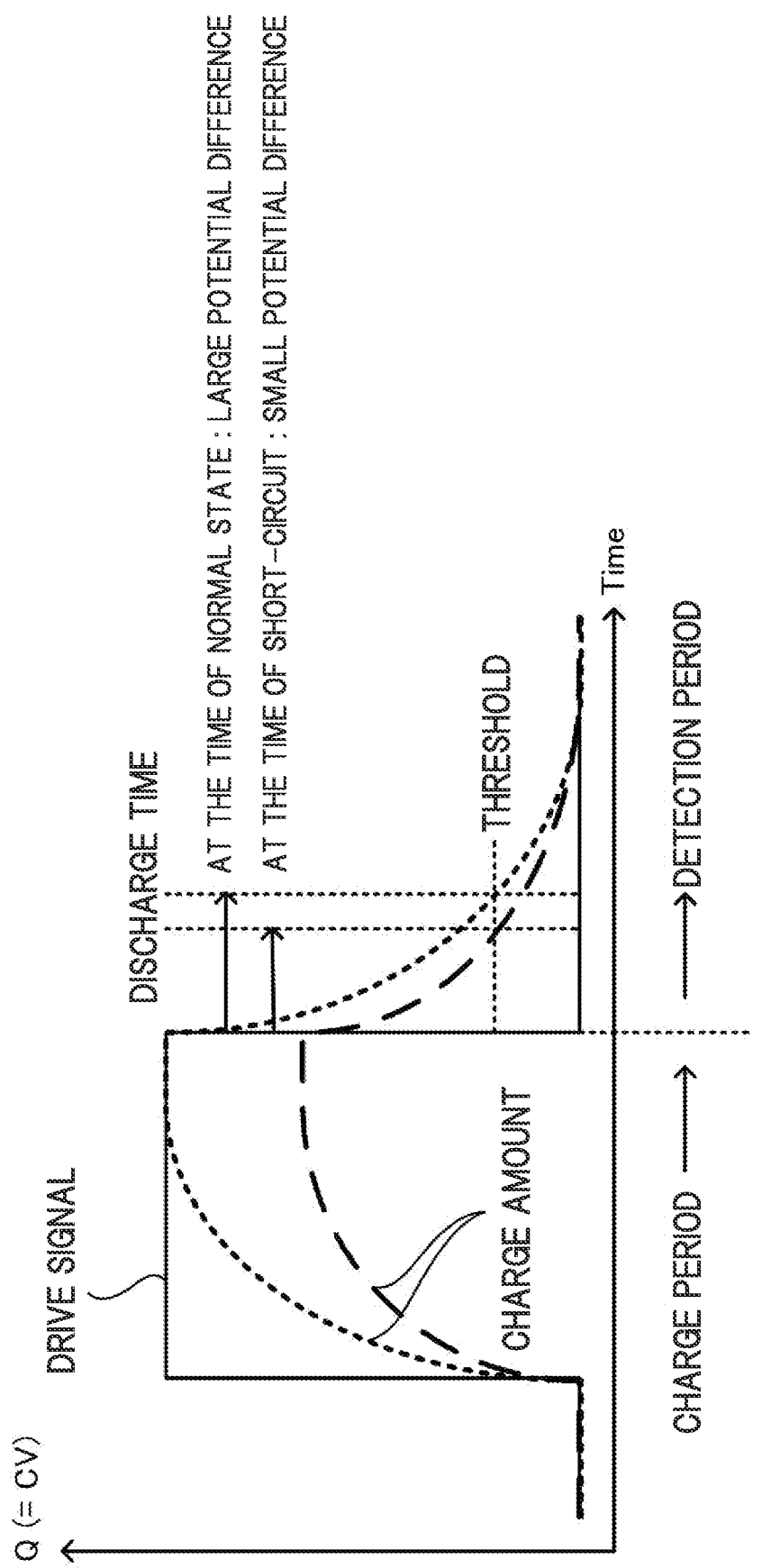

LIQUID CRYSTAL DISPLAY DEVICE AND LINE DEFECT DETECTION METHOD

CROSS-REFERENCE TO RELATED APPLICATION

This application claims the benefit of Japanese Patent Application No. 2021-163375, filed on Oct. 4, 2021, the entire disclosure of which is incorporated by reference herein.

TECHNICAL FIELD

The present disclosure relates to a liquid crystal display device and a line defect detection method.

BACKGROUND

A method for detecting a line defect occurring in a liquid crystal display device is known. For example, AM-FPD 2018, Special Symposium 2-2, Evolution of In-Vehicle Display Technology and Innovation of the Cockpit System, Y. Muto, Panasonic Corp., Japan discloses a method of detecting a change in voltage and current by providing a circuit on a terminal end side of a drive line of a liquid crystal display panel in order to detect a defect in the liquid crystal display panel. WO 2018/079636 A discloses a method for inspecting a source line or a gate line by a failure inspection circuit in a liquid crystal display device having an active matrix liquid crystal panel. JP H10-97203 A discloses a method for inspecting disconnection or short-circuit of a scanning line or a signal line in a liquid crystal display.

SUMMARY

In the methods disclosed in AM-FPD 2018, Special Symposium 2-2, Evolution of In-Vehicle Display Technology and Innovation of the Cockpit System, Y. Muto, Panasonic Corp., Japan and WO 2018/079636 A and JP H10-97203 A, it is necessary to provide a special circuit in order to detect a line defect. Therefore, the circuit scale increases. In addition, a line connecting the line defect detection circuit, the source line, and the gate line is also required, and there is a problem that the external size of the display panel increases due to the line connected to the line defect detection circuit. Under such circumstances, a method for detecting a line defect in a liquid crystal display device with a simple configuration is required.

A liquid crystal display device according to a first aspect of the present disclosure is a liquid crystal display device including a liquid crystal panel; and a driver that drives the liquid crystal panel, the liquid crystal panel including:

a plurality of sensor electrodes arranged in a matrix form for detecting a touch on the liquid crystal panel; and a plurality of liquid crystal drive lines configured to display an image on the liquid crystal panel, and the driver including:

a control unit configured to execute a display process of displaying the image on the liquid crystal panel, a touch detection process of detecting the touch on the liquid crystal panel, and a line defect determination process of determining presence of a line defect in the liquid crystal panel, in which in the line defect determination process, the control unit applies a drive signal to each of the sensor electrodes, determines whether a detection value detected from each of the sensor electrodes when the drive signal is applied meets a predetermined determination criterion, and determines that the line defect has occurred when the sensor electrodes whose detection values meet the determination criterion among the plurality of sensor electrodes are linearly distributed.

A line defect detection method according to a second aspect of the present disclosure is a line defect detection method for detecting a line defect in a liquid crystal display device including a plurality of sensor electrodes arranged in a matrix form and a plurality of liquid crystal drive lines, the method including:

applying a drive signal to each of the sensor electrodes;

determining whether a detection value detected from each of the sensor electrodes when the drive signal is applied meets a predetermined determination criterion; and determining that the line defect has occurred when the sensor electrodes whose detection values meet the determination criterion among the plurality of sensor electrodes are linearly distributed.

It is to be understood that both the foregoing general description and the following detailed description are exemplary and explanatory and are not restrictive of this disclosure.

BRIEF DESCRIPTION OF DRAWINGS

FIG. 25 is a diagram illustrating a waveform of a charge amount of a sensor electrode when a drive signal is applied in the fourth embodiment.

DETAILED DESCRIPTION

Hereinafter, a liquid crystal display device and a line defect detection method according to embodiments will be described with reference to the drawings.

First Embodiment

First, a configuration of a liquid crystal display device 10 according to the first embodiment will be described with reference to FIGS. 1 and 2. The liquid crystal display device 10 is, for example, a display device for a vehicle or an aircraft, but its application is not limited thereto.

Figure 1:
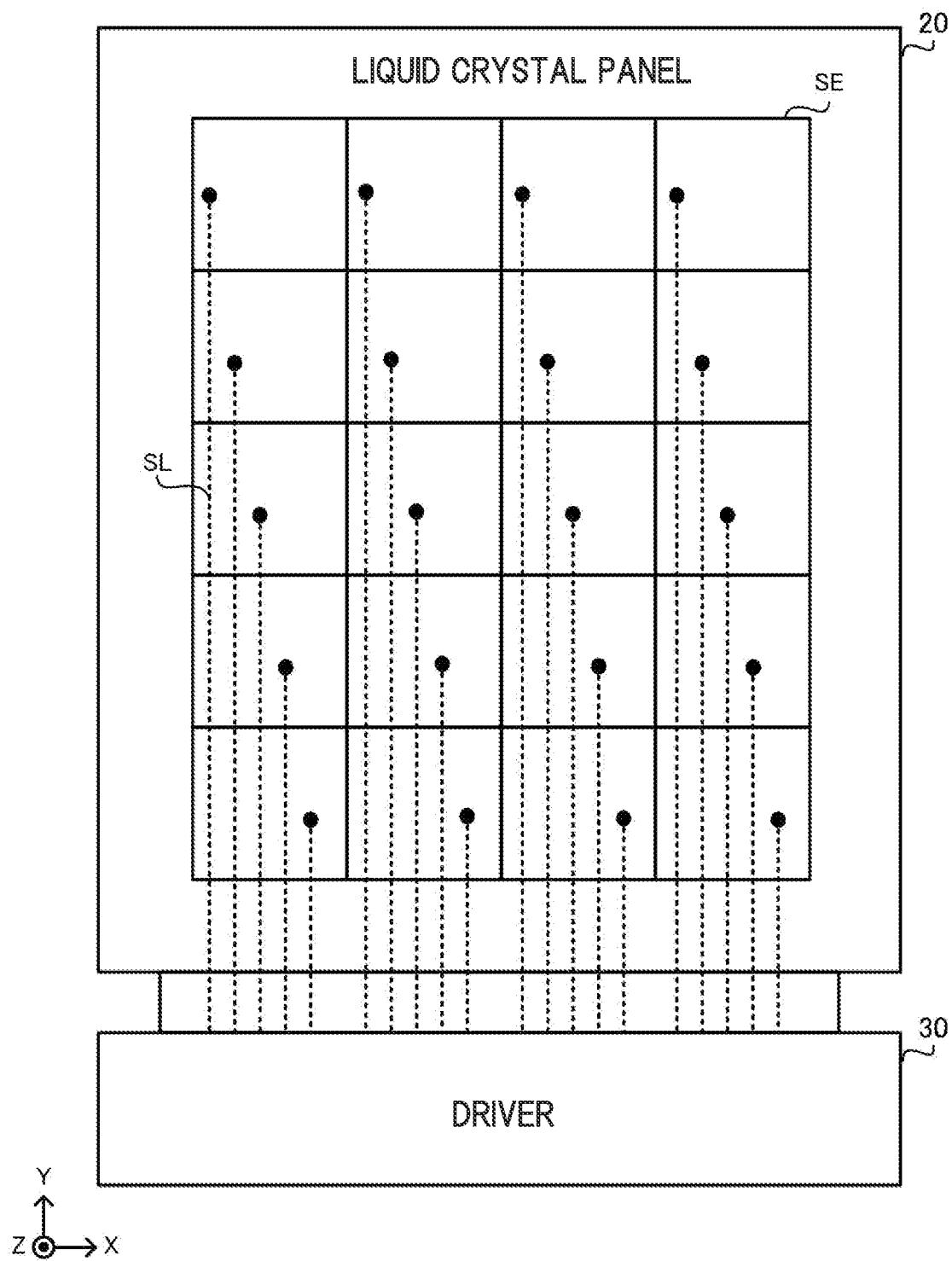
FIG. 1 is a schematic configuration diagram of a liquid crystal display device according to a first embodiment.
Figure 2:
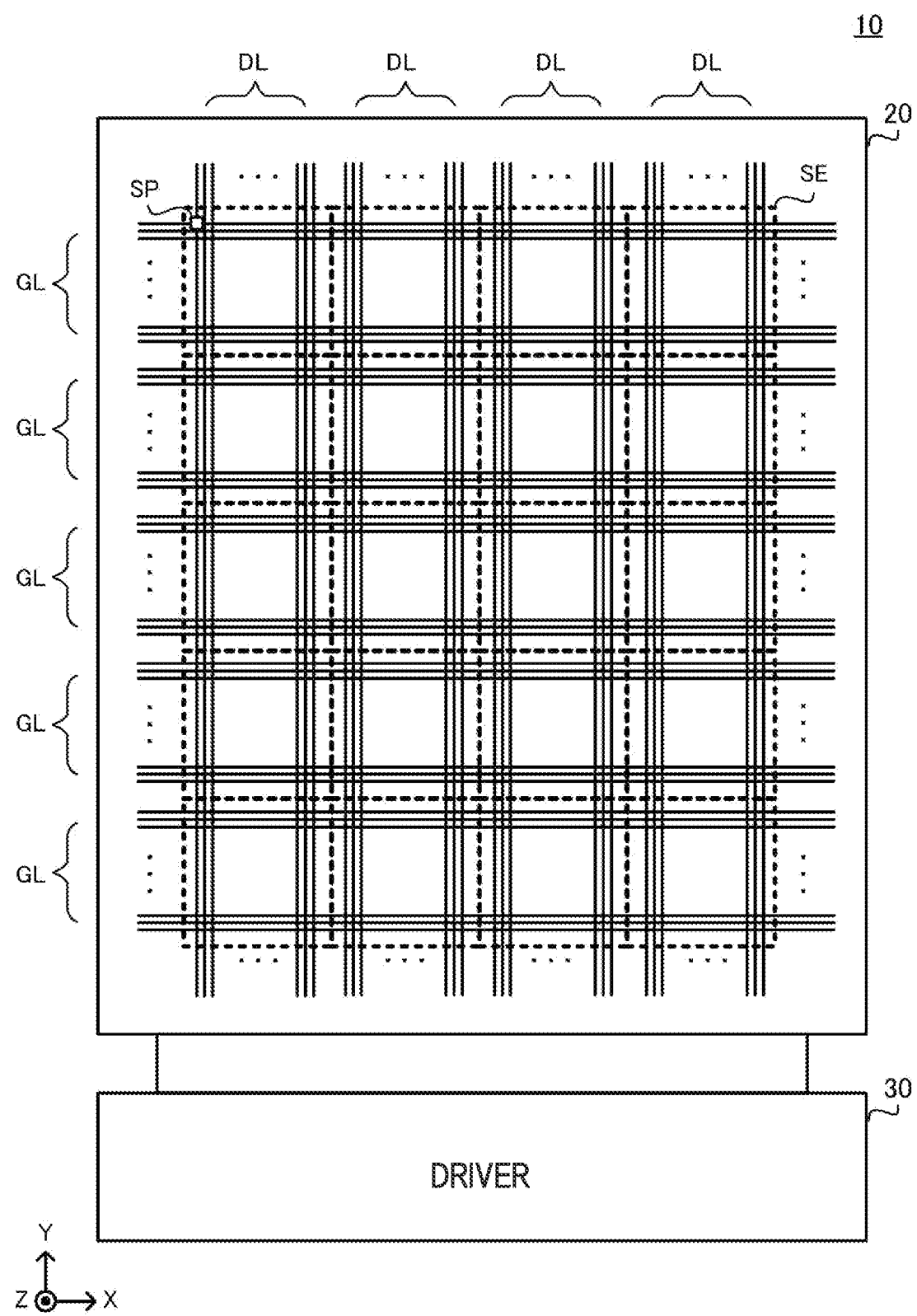
FIG. 2 is a diagram illustrating a liquid crystal drive line in the liquid crystal display device according to the first embodiment.

As illustrated in FIGS. 1 and 2, the liquid crystal display device 10 includes a liquid crystal panel 20 and a driver 30 that drives the liquid crystal panel 20. Here, FIG. 1 is a diagram schematically illustrating a configuration related to touch detection in the liquid crystal panel 20, and FIG. 2 is a diagram schematically illustrating a configuration related to display in the liquid crystal panel 20.

The liquid crystal panel 20 has an image display function and a touch detection function as an in-cell type touch panel. The in-cell type is a configuration in which an electrode for touch detection is provided on one of two substrates that sandwich a liquid crystal material and constitute a liquid crystal panel. As illustrated in FIG. 1, the liquid crystal panel 20 includes a plurality of sensor electrodes SE and a plurality of sensor lines SL.

Each of the plurality of sensor electrodes SE is an electrode for detecting a touch on a touch detection region. Here, the touch means that a detection object comes into contact with the sensor electrode SE or that the detection object is close to the sensor electrode SE to such an extent that a parasitic capacitance is formed between the detection object and the sensor electrode SE. Specifically, the detection object is a finger of a user of the liquid crystal display device 10. Note that the detection object is not limited to a finger, and may be a part of a living body, a stylus pen, a touch pen, or the like as long as a parasitic capacitance can be formed between the detection object and the sensor electrode SE.

The plurality of sensor electrodes SE is arranged in a matrix form on substantially the entire surface of the liquid crystal panel 20, and detect a touch of a detection object on the surface of the liquid crystal panel 20. The plurality of sensor electrodes SE is arranged at positions close to a gate line GL and a data line DL to such an extent that a parasitic capacitance is formed between the sensor electrode SE and the gate line GL and the data line DL. Each sensor electrode SE is also called a touch electrode, and is a rectangular transparent electrode of 1 to 5 mm in length and width. In FIG. 1, as an example, the plurality of sensor electrodes SE is arranged in five rows and four columns, but the arrangement of the plurality of sensor electrodes SE is not limited thereto.

Each sensor electrode SE is electrically connected to the driver 30 via the sensor line SL indicated by a broken line in FIG. 1. One sensor line SL is connected to one sensor electrode SE. Each sensor electrode SE receives an input of a drive signal from the driver 30 via the sensor line SL, and outputs an output signal, which is a response signal to the drive signal, to the driver 30.

Figure 3:
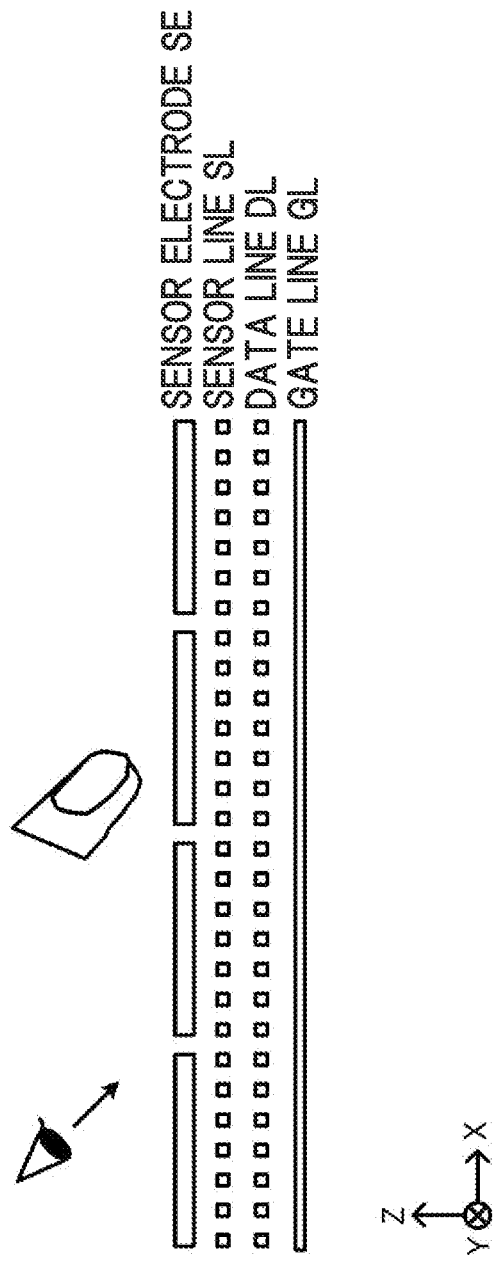
FIG. 3 is a schematic diagram illustrating a cross-section of a liquid crystal panel in the liquid crystal display device according to the first embodiment.

As illustrated in FIG. 2, the liquid crystal panel 20 includes a plurality of gate lines GL and a plurality of data lines DL as liquid crystal drive lines for displaying an image on the liquid crystal panel 20. As illustrated in the cross-sectional view of FIG. 3, each data line DL and each gate line GL are arranged below the sensor electrode SE and the sensor line SL. In order to avoid complexity, the sensor line SL is omitted in FIG. 2.

Each of the plurality of gate lines GL is arranged so as to run in the X direction (lateral direction or row direction) which is the first direction. A gate signal is applied to each of the plurality of gate lines GL. Each of the plurality of data lines DL is arranged so as to run in the Y direction (longitudinal direction or column direction) which is the second direction intersecting the first direction. A data voltage corresponding to an image signal (video signal) is applied to each of the plurality of data lines DL. The data line DL is also referred to as a source line. When the gate line GL and the data line DL are referred to without distinction, the gate line GL and the data line DL are referred to as liquid crystal drive lines.

A subpixel SP is arranged at a position where the gate line GL and the data line DL intersect with each other. As an example, the subpixel SP is a fine element that emits light in a predetermined color among red, green, and blue (RGB) which are three primary colors of light. The subpixel SP may be a combination of the three primary colors and another emission color, or may be a combination of colors other than the three primary colors. Although only one subpixel SP is illustrated in FIG. 2 to avoid complexity, the subpixels SP are actually arranged at positions where the gate lines GL and the data lines DL intersect with each other.

Each data line DL is connected to the subpixel SP via a thin film transistor (TFT) (not illustrated). Each gate line GL is connected to the gate of the TFT. Since the data lines DL are required as many as the number of subpixels SP corresponding to each of RGB, the data lines DL are arranged at three times the density of the gate lines GL.

Next, a configuration of the driver 30 will be described with reference to FIG. 4. The driver 30 is electrically connected to the liquid crystal panel 20 and is a circuit for driving the liquid crystal panel 20. The driver 30 includes a liquid crystal driver 31, a sensor driver 32, and a control unit 33.

The liquid crystal driver 31 is a circuit for displaying an image on the liquid crystal panel 20. The liquid crystal driver 31 is electrically connected to each gate line GL and each data line DL. The liquid crystal driver 31 outputs various signals to each gate line GL and each data line DL according to the control signal from control unit 33.

The sensor driver 32 is a circuit for detecting the presence of a touch and a touch position on the liquid crystal panel 20. The sensor driver 32 is electrically connected to each sensor line SL, and is individually connected to each sensor electrode SE via the sensor line SL. The sensor driver 32 outputs various signals to each sensor electrode SE according to a control signal from the control unit 33.

The control unit 33 is connected to the liquid crystal driver 31 and the sensor driver 32 via an internal bus, and executes processing and calculation related to control of the driver 30. As an example, the control unit 33 includes a central processing unit (CPU), a read only memory (ROM), and a random access memory (RAM). In the control unit 33, the CPU reads a program and data stored in the ROM, and controls the entire liquid crystal display device 10 using the RAM as a work area.

Figure 4:
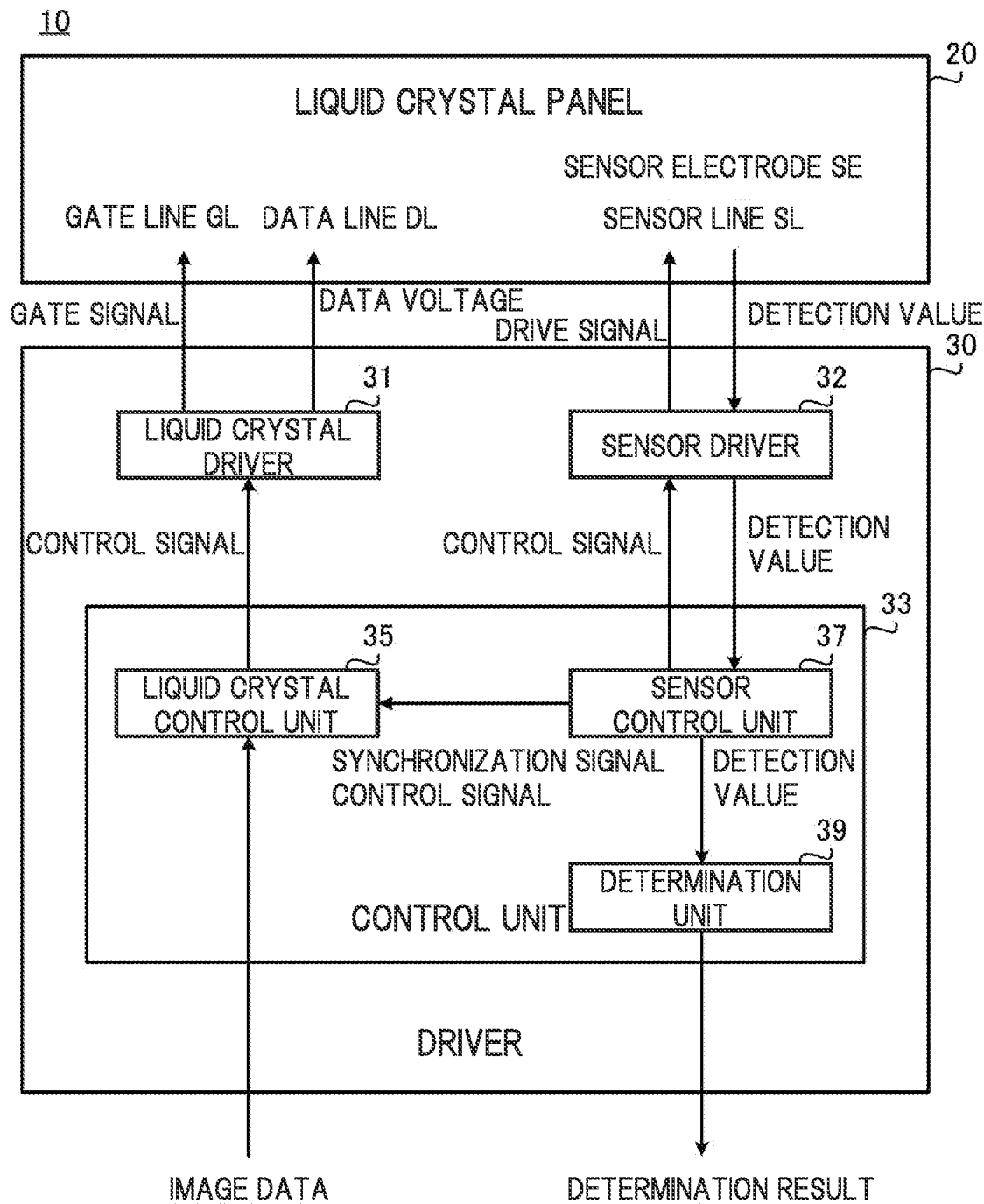
FIG. 4 is a block diagram illustrating a configuration of a driver in the liquid crystal display device according to the first embodiment.

As illustrated in FIG. 4, the control unit 33 functionally includes a liquid crystal control unit 35, a sensor control unit 37, and a determination unit 39. In the control unit 33, the functions of these units are implemented by the CPU reading a program stored in the ROM into the RAM and executing the program.

The liquid crystal control unit 35 executes a display process of displaying an image on the liquid crystal panel 20 by controlling the liquid crystal driver 31. Specifically, the liquid crystal control unit 35 receives input image data from the outside, converts the received input image data into a control signal, and outputs the control signal to the liquid crystal driver 31. The liquid crystal driver 31 outputs a drive signal for displaying an image to each gate line GL and each data line DL according to the control signal output from the liquid crystal control unit 35.

In addition, the liquid crystal control unit 35 outputs, to the sensor control unit 37, a synchronization signal indicating a blank period of a display period (liquid crystal drive period) which is a period in which a display process is executed. Here, the blank period (display blank period) of the display period means a period in which a display process is not executed between two consecutive display periods.

The sensor control unit 37 executes a touch detection process of detecting a touch on the liquid crystal panel 20 by controlling the sensor driver 32. Specifically, the sensor control unit 37 outputs a control signal to the sensor driver 32 in a touch detection period that is a period in which a touch detection process is executed. The sensor driver 32 outputs a drive signal to each sensor electrode SE according to a control signal output from the sensor control unit 37.

The sensor control unit 37 receives a detection value detected from each sensor electrode SE from the sensor driver 32 and outputs the detection value to the determination unit 39. Further, the sensor control unit 37 outputs a synchronization signal and a control signal synchronized with the drive signal output to the sensor electrode SE to the liquid crystal control unit 35.

The determination unit 39 receives the detection value of each sensor electrode SE from the sensor control unit 37, and determines the presence of a touch and the position of the touch on the liquid crystal panel 20 based on the received detection value. In addition, the determination unit 39 determines the presence of a line defect in the liquid crystal panel 20. The determination unit 39 outputs the touch and line defect determination results to the outside.

The control unit 33 alternately repeats the display process and the touch detection process at predetermined time intervals. Hereinafter, details of the display process and the touch detection process will be described.

(Display Process)

Figure 5:
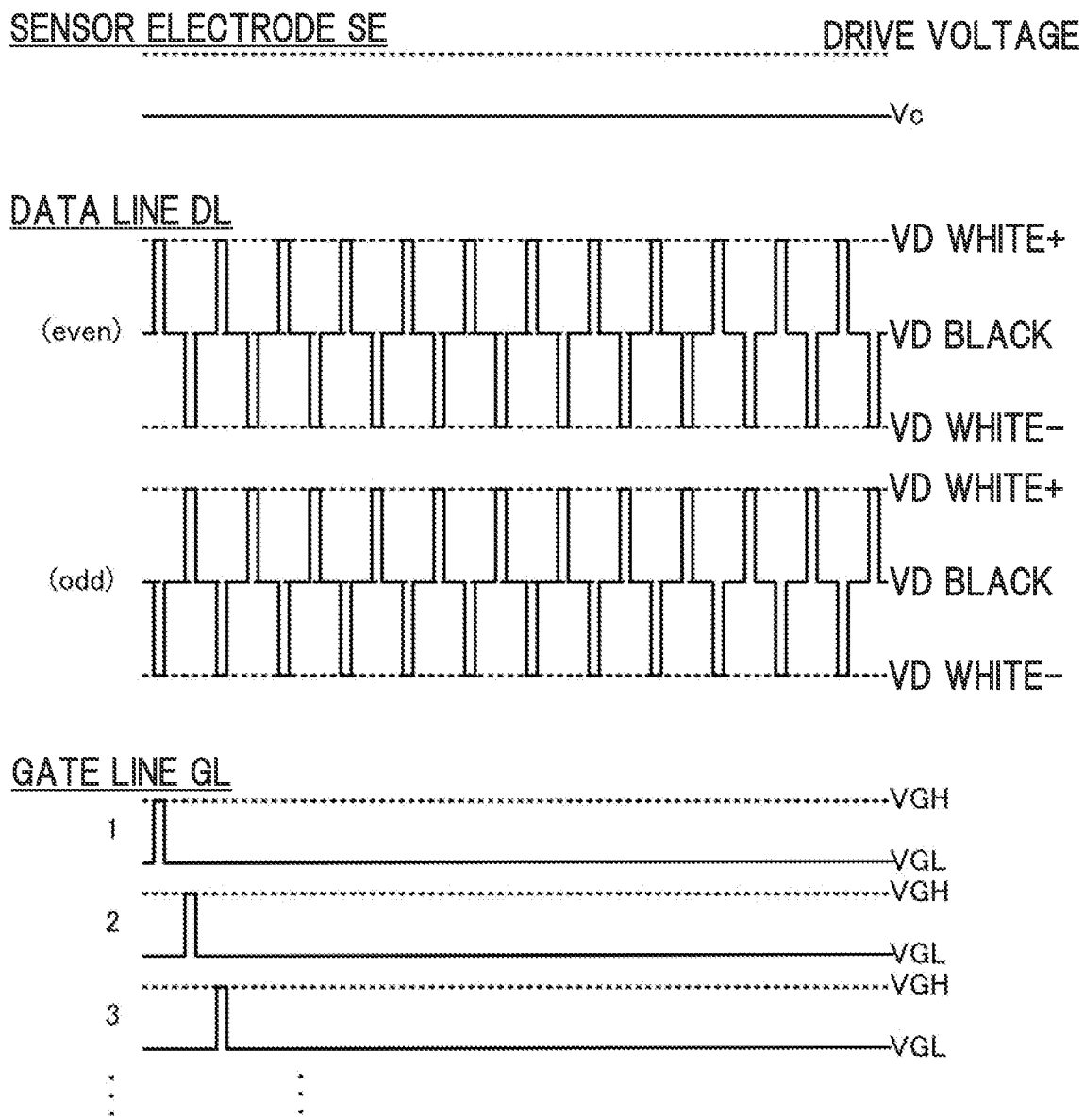
FIG. 5 is a timing chart of a display process executed by the liquid crystal display device according to the first embodiment.

FIG. 5 illustrates a timing chart of signals applied to the sensor electrode SE, gate line GL, and data line DL in the display process.

In a case where a display process is executed, the sensor control unit 37 applies a reference voltage Vc without applying a drive voltage to the sensor line SL. In other words, in the display process, the sensor control unit 37 does not output a pulse serving as a noise source and applies a constant potential to the sensor line SL. Alternatively, the sensor control unit 37 may set the sensor line SL to a high-impedance state.

On the other hand, in the display process, the liquid crystal control unit 35 sequentially applies a gate signal to each gate line GL. The gate signal is a pulse-like signal for turning on the TFT connected to the subpixel SP in which the data voltage is written. The liquid crystal control unit 35 sequentially turns on the TFTs connected to the gate lines GL for each row by applying the gate signals to the plurality of gate lines GL running in the row direction one by one.

Next, the liquid crystal control unit 35 applies an image signal to each data line DL. Specifically, the liquid crystal control unit 35 applies, to each data line DL, a data voltage that defines an image in a write target row and indicates the gradation of each subpixel SP in the row to which the gate signal is applied. More specifically, since the polarities are different for respective adjacent data lines DL, the liquid crystal control unit 35 applies, as the data voltage, a voltage whose polarity is opposite between the even-numbered data line DL and the odd-numbered data line DL.

The data voltage applied to each data line DL is applied to the subpixel SP via the TFT of the corresponding row. As a result, the gradation of each subpixel SP is set, and the gradation is maintained for one frame period. The liquid crystal control unit 35 displays an image on the liquid crystal panel 20 by repeating such an operation for all the subpixels SP.

(Touch Detection Process)

Figure 6:
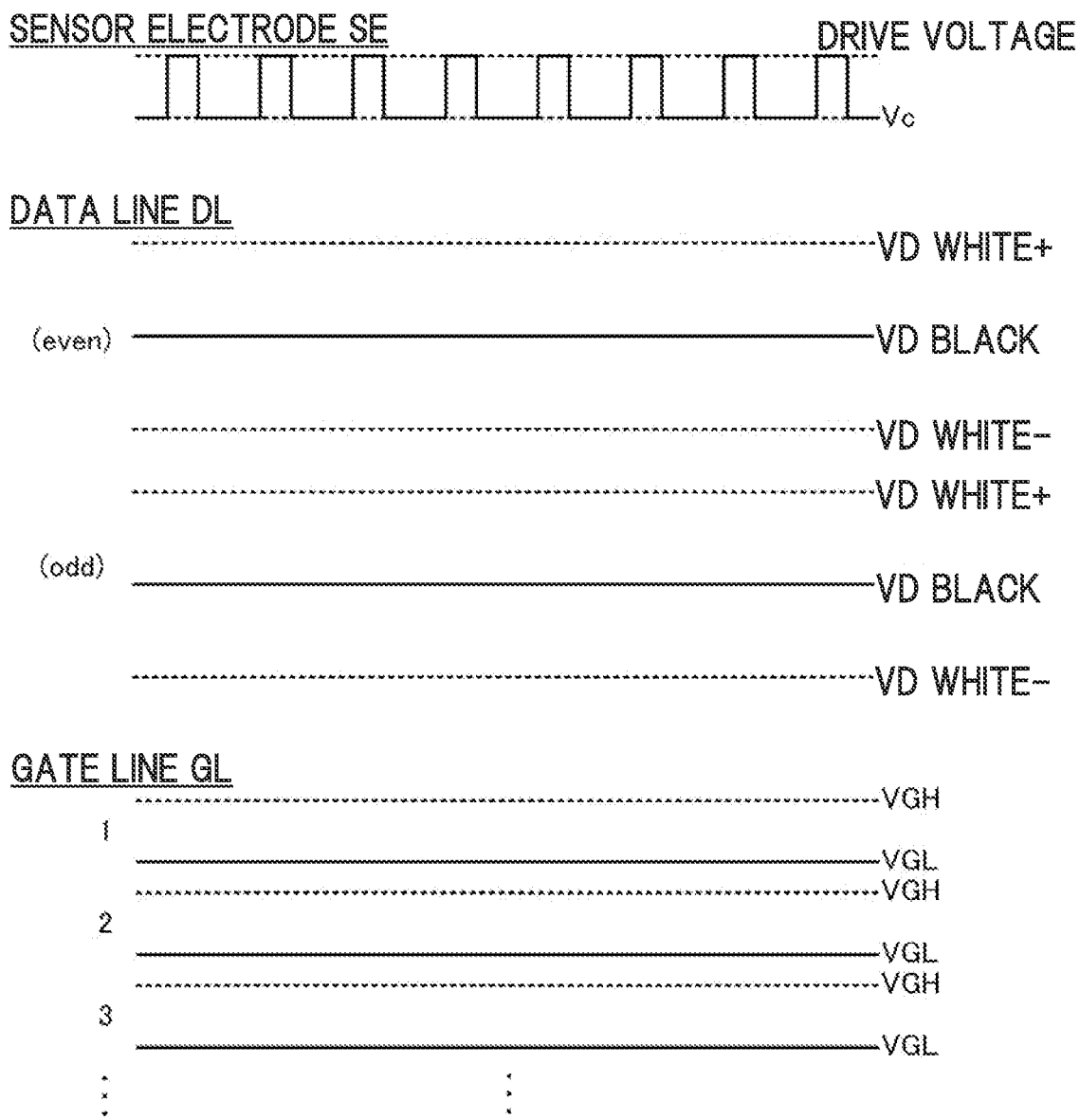
FIG. 6 is a timing chart of a touch detection process executed by the liquid crystal display device according to the first embodiment.

FIG. 6 illustrates a timing chart of signals applied to the sensor electrode SE, gate line GL, and data line DL in the touch detection process. The liquid crystal display device 10 of the first embodiment detects a touch by a self-capacitance method.

In the case of executing a touch detection process, the liquid crystal control unit 35 applies a constant potential to each liquid crystal drive line. Here, the constant potential means a potential that is not applied with a pulse or the like and does not substantially vary with time. Specifically, the liquid crystal control unit 35 applies a constant potential of a black potential (near VDcenter) to each data line DL. Alternatively, the liquid crystal driver 31 may fix each data line DL in a floating state. The liquid crystal control unit 35 does not output the gate signal to each gate line GL, and fixes the potential of each gate line GL at an off-potential VGL.

When a constant potential is applied to each liquid crystal drive line as described above, the sensor control unit 37 applies a drive signal to each sensor electrode SE. Here, the drive signal is a signal configured by a row of positive drive pulses. Each drive pulse is a rectangular pulse. The pulse width of the drive pulse is, for example, 3 to 7 μs, and the pulse period is, for example, three times the pulse width. The sensor control unit 37 applies such a drive signal to the plurality of sensor electrodes SE provided in the liquid crystal panel 20 in parallel, that is, simultaneously at the same timing.

The Low voltage of the drive pulse is the reference voltage Vc, and the High voltage (drive voltage) corresponding to the pulse wave height of the drive pulse is set to a voltage (for example, 5 V) at which the proximity of a detection object can be detected. However, the drive voltage is not limited. The reference voltage Vc is, for example, a fixed DC voltage such as a ground voltage or a power supply voltage. However, the reference voltage Vc may be any voltage as long as the sensor electrode SE can be prevented from entering a floating state and the radiated electromagnetic noise can be suppressed.

When a drive signal is applied to each sensor electrode SE, the sensor control unit 37 acquires a detection value detected from each sensor electrode SE when the drive signal is applied. Specifically, the sensor driver 32 detects the voltage value of each sensor electrode SE when the drive signal is applied. The sensor control unit 37 acquires a voltage value (output voltage) of each sensor electrode SE detected by the sensor driver 32 as a detection value, and outputs the voltage value to the determination unit 39. The determination unit 39 detects a touch on the liquid crystal panel 20 based on a detection value of each sensor electrode SE with respect to the drive signal.

Figure 7:
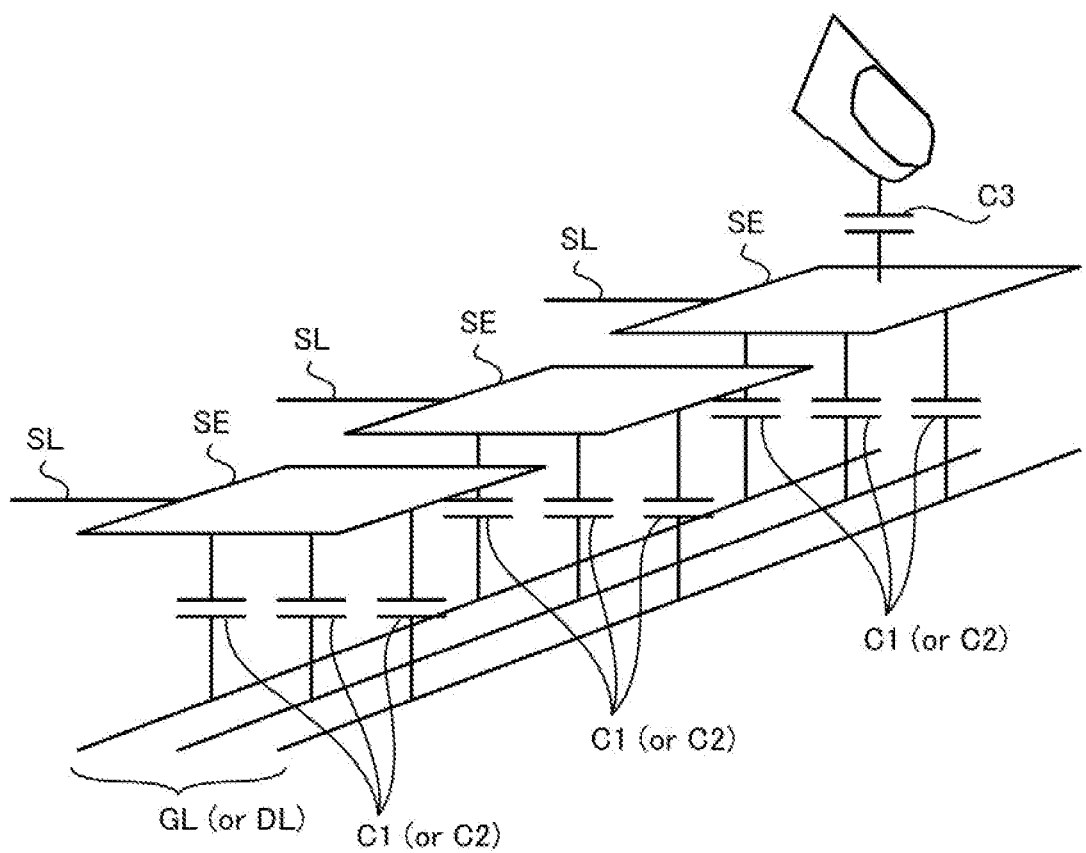
FIG. 7 is a schematic diagram illustrating sensor electrodes and liquid crystal drive lines at the time of touch detection in the first embodiment.

As illustrated in FIG. 7, in each sensor electrode SE, the parasitic capacitances C1 and C2 are formed between a plurality of gate lines GL and a plurality of data lines DL passing through opposing positions. When a human finger as a detection object comes into contact with or approaches the sensor electrode SE, a parasitic capacitance C3 is formed between the finger and at least one sensor electrode SE, and a current transiently flows through the parasitic capacitance C3. The magnitude of the parasitic capacitance C3 formed at this time changes according to the distance between the finger and the sensor electrode SE. In this manner, when the sensor electrode SE is touched, the parasitic capacitance formed in the sensor electrode SE increases.

Figure 8:
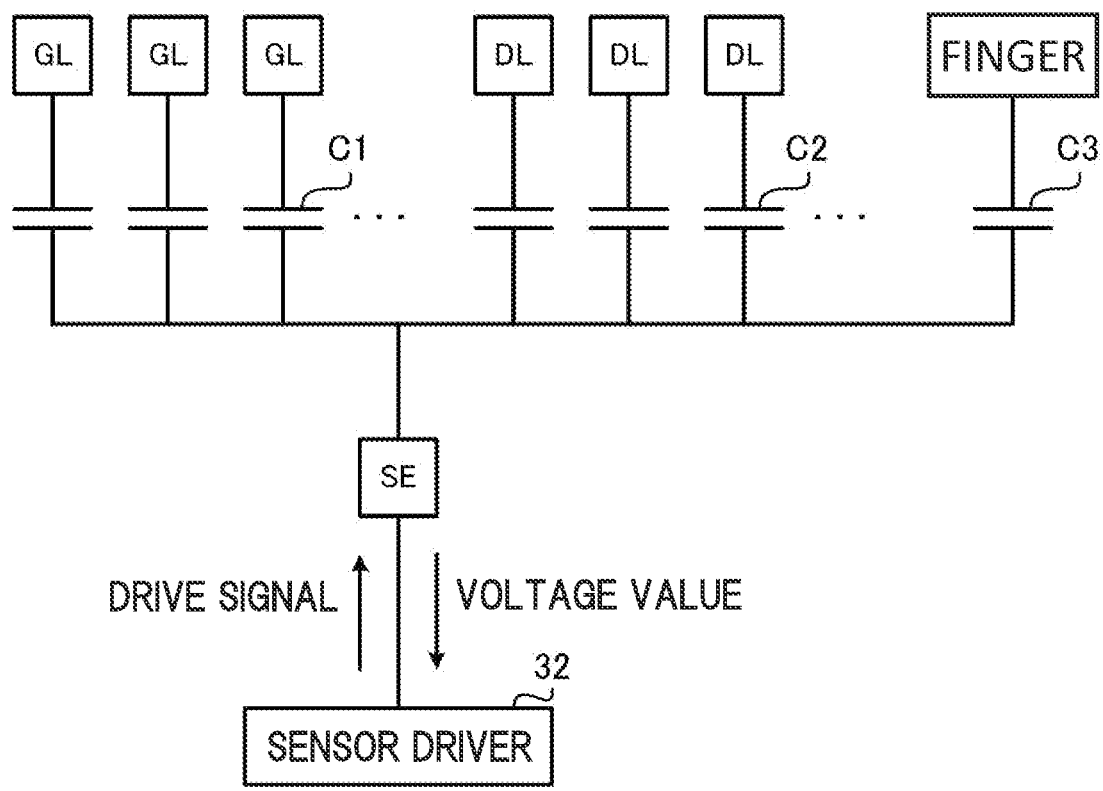
FIG. 8 is a diagram illustrating an equivalent circuit per sensor electrode at the time of touch detection in the first embodiment.

More specifically, in a case where a certain sensor electrode SE is touched with a finger as in the equivalent circuit illustrated in FIG. 8, a parasitic capacitance C3 is further formed in parallel to the sensor electrode SE in addition to the parasitic capacitances C1 and C2 between the plurality of gate lines GL and the plurality of data lines DL passing through opposing positions. Therefore, when the sensor electrode SE is touched, the parasitic capacitance formed in the sensor electrode SE is increased by an amount corresponding to the parasitic capacitance C3 as compared with the case where the sensor electrode SE is not touched.

The determination unit 39 determines whether the detection value of each sensor electrode SE when the drive signal is applied meets a determination criterion indicating that the parasitic capacitance C3 has increased. Then, when the detection value of a certain sensor electrode SE meets the determination criterion, the determination unit 39 determines that the sensor electrode SE has been touched.

Specifically, the determination unit 39 monitors the voltage value of each sensor electrode SE when the drive signal is applied as the detection value. Then, the determination unit 39 measures the charge time of each sensor electrode SE, specifically, the time when the voltage value of each sensor electrode SE in a case where the drive signal is applied rises to a predetermined threshold or more.

In a case where the sensor electrode SE is touched, the parasitic capacitance formed in the sensor electrode SE increases as compared with a case where the sensor electrode SE is not touched, and thus, the charge time in which the sensor electrode SE is charged by the drive pulse increases. Therefore, when the charge time measured in a certain sensor electrode SE is larger than a predetermined reference value, the determination unit 39 determines that the detection object touched the sensor electrode SE.

When it is determined that at least one sensor electrode SE is touched, the determination unit 39 specifies the position of the touch from the distribution of the detected parasitic capacitances. In other words, the determination unit 39 specifies the position coordinates at which the detection object is touched based on the distribution of at least one sensor electrode SE determined to be touched in the plurality of sensor electrodes SE arranged in a matrix form. In this manner, the determination unit 39 determines the presence of a touch and the position of the touch based on a change in the parasitic capacitance formed in each sensor electrode SE.

(Line Defect Determination Process)

In addition to the display process and the touch detection process as described above, the control unit 33 executes a line defect determination process. Here, the line defect means a defect (display defect) occurring on the display. Specifically, the line defect includes disconnection and short-circuit of the gate line GL or data line DL. The liquid crystal display device 10 of the first embodiment determines whether the disconnection of the gate line GL or data line DL has occurred as the line defect.

Figure 9:
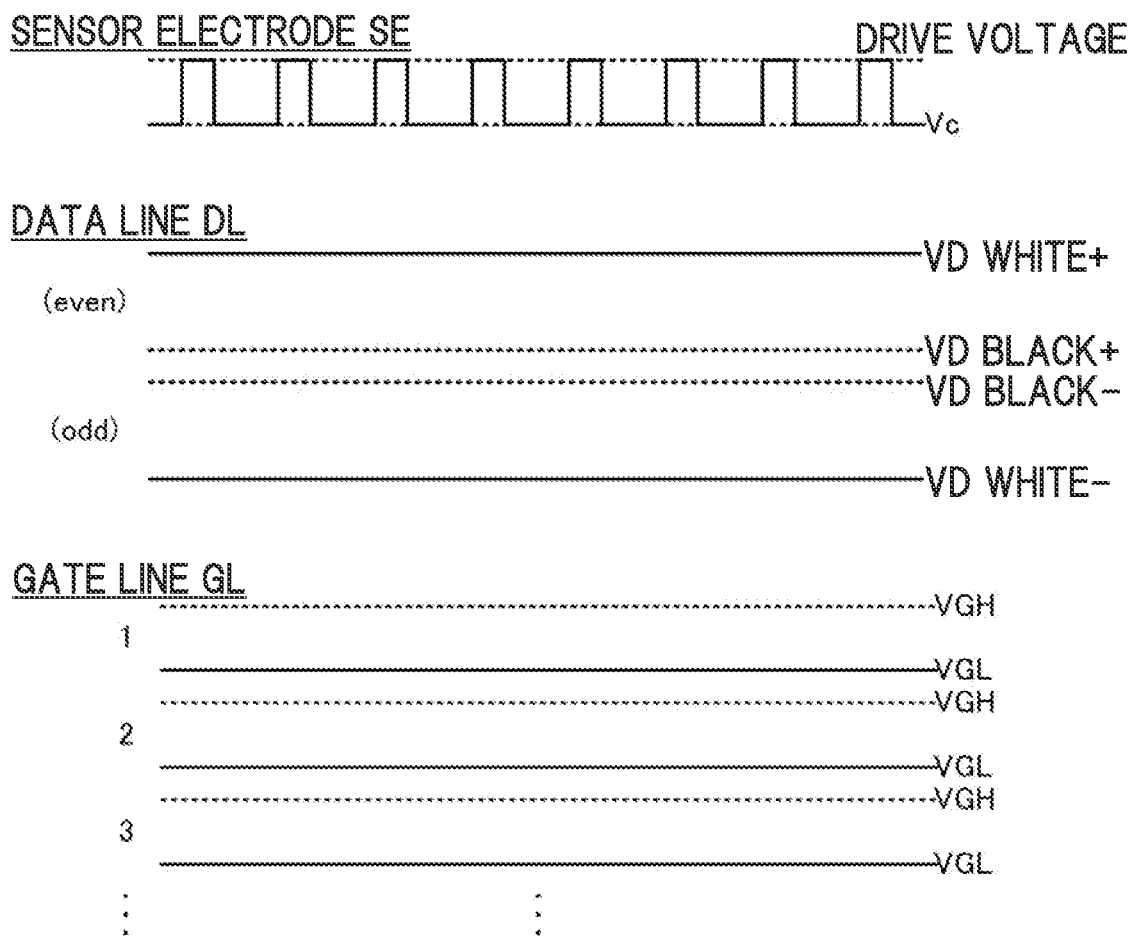
FIG. 9 is a timing chart of a line defect determination process executed by the liquid crystal display device according to the first embodiment.

FIG. 9 is a timing chart of signals applied to the sensor electrode SE, gate line GL, and data line DL in the line defect determination process according to the first embodiment. The control unit 33 executes the line defect determination process in at least one of a period from when the liquid crystal display device 10 is started to when the first display process is executed and a display blank period which is a period between the two display processes.

When the line defect determination process is executed, the liquid crystal control unit 35 applies a constant potential, that is, a potential that does not substantially vary with time, to each liquid crystal drive line. At this time, in order to enhance the detection accuracy of the parasitic capacitances C1 and C2, the liquid crystal control unit 35 applies a potential as far as possible from the potential of the drive signal applied to the sensor electrode SE, that is, the potential (for example, 5 V) corresponding to the High voltage of the drive pulse to each gate line GL and each data line DL.

Specifically, similarly to the touch detection process, the liquid crystal control unit 35 does not apply the gate signal to each gate line GL, but applies an off-potential VGL. As a result, a potential difference between the off-potential VGL and the potential of the drive signal is secured between each gate line GL and each sensor electrode SE.

On the other hand, while the liquid crystal control unit 35 applies the black potential to each data line DL in the touch detection process, the white potential (maximum/minimum VD) is applied to each data line DL in the line defect determination process. More specifically, the liquid crystal driver 31 applies a positive white potential (maximum potential, e.g. 10.2 V) to the even-numbered data lines DL and applies a negative white potential (minimum potential, e.g. 0.2 V) to the odd-numbered data lines DL in consideration of the difference in polarity between the adjacent data lines DL. As described above, the liquid crystal control unit 35 applies the potential to each data line DL such that the difference between the potential applied to each data line DL and the potential of the drive signal in the line defect determination process is larger than the difference between the potential applied to each data line DL and the potential of the drive signal in the touch detection process.

When a constant potential is applied to each liquid crystal drive line as described above, the sensor control unit 37 applies a drive signal to each sensor electrode SE. Similarly to the touch detection process, the sensor control unit 37 applies the drive pulse of the positive polarity to each of the plurality of sensor electrodes SE provided in the liquid crystal panel 20 in parallel, that is, simultaneously at the same timing.

When a drive signal is applied to each sensor electrode SE, the sensor control unit 37 acquires a detection value detected from each sensor electrode SE in response to the drive signal. Specifically, the sensor driver 32 detects a voltage value of each sensor electrode SE when a drive signal is applied to each sensor electrode SE. The sensor control unit 37 acquires a voltage value of each sensor electrode SE detected by the sensor driver 32 as a detection value, and outputs the voltage value to the determination unit 39.

In the line defect determination process, the determination unit 39 determines whether the detection value of each sensor electrode SE for the drive signal meets a predetermined determination criterion. Here, the determination criterion is a criterion indicating that a line defect occurs in the liquid crystal panel 20. In the first embodiment, the determination criterion is a criterion indicating that the parasitic capacitance C1 or C2 formed in the sensor electrode SE has decreased due to disconnection.

Figure 10:
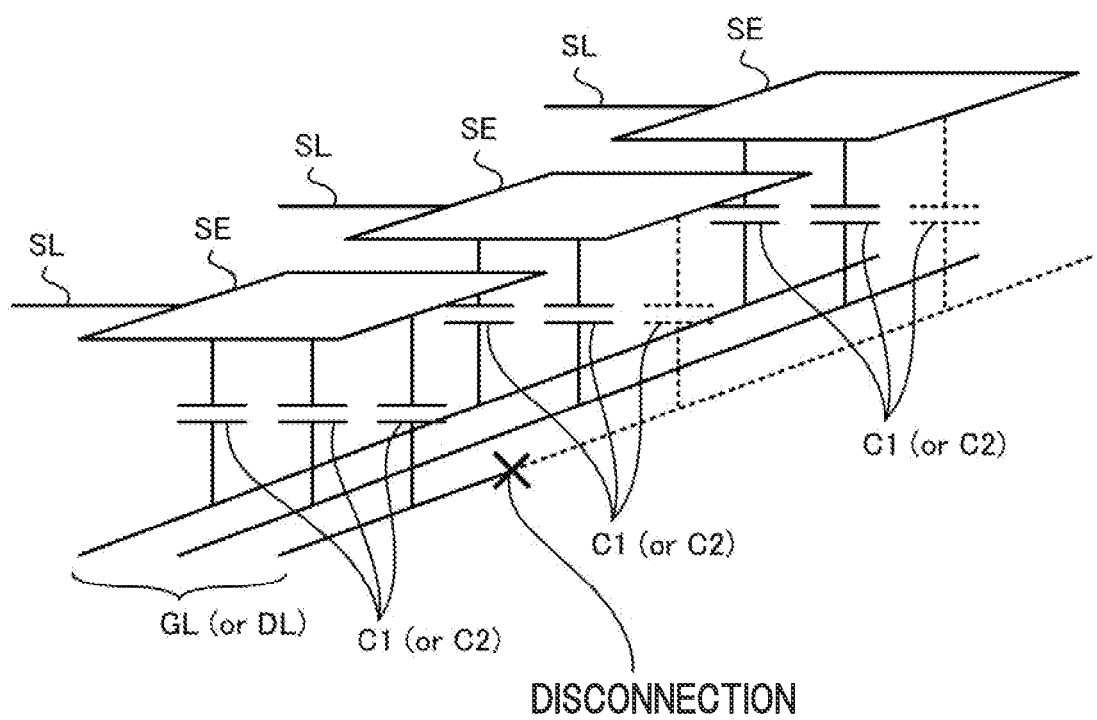
FIG. 10 is a schematic diagram illustrating a sensor electrode and a liquid crystal drive line at the time of disconnection in the first embodiment.

More specifically, as illustrated in FIG. 10, when the disconnection occurs in any one of the gate lines GL and data lines DL, the charge moves from the liquid crystal driver 31 to the disconnection portion, but the charge does not move from the disconnection portion. Therefore, in at least one sensor electrode SE located ahead of the disconnection portion, the parasitic capacitance C1 or C2 of the line in which the charge transfer has disappeared changes, and the detection results of the charge time, the accumulated charge amount, and the like are affected.

Figure 11:
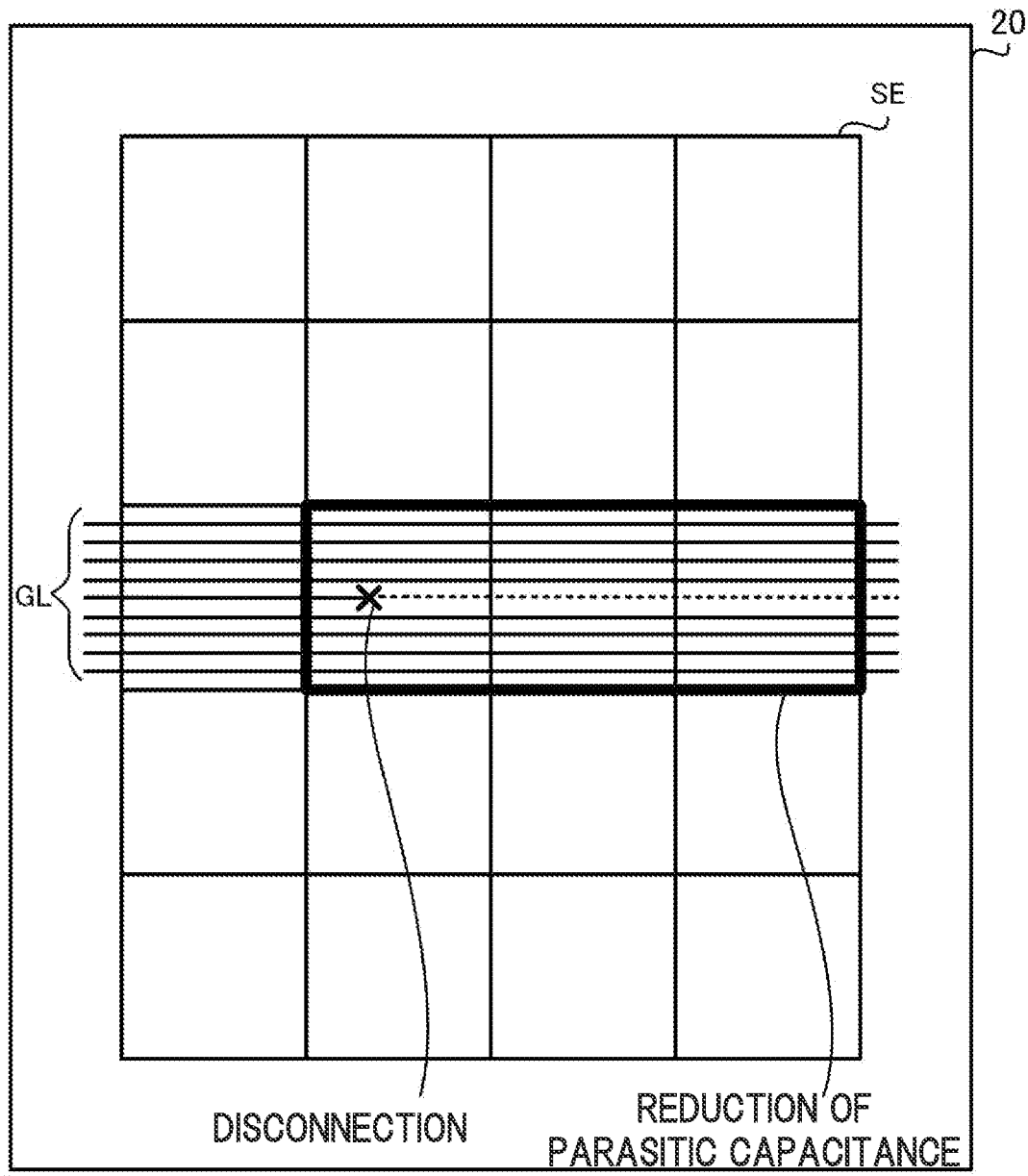
FIG. 11 is a diagram illustrating a sensor electrode whose parasitic capacitance changes at the time of disconnection in the first embodiment.
Figure 12:
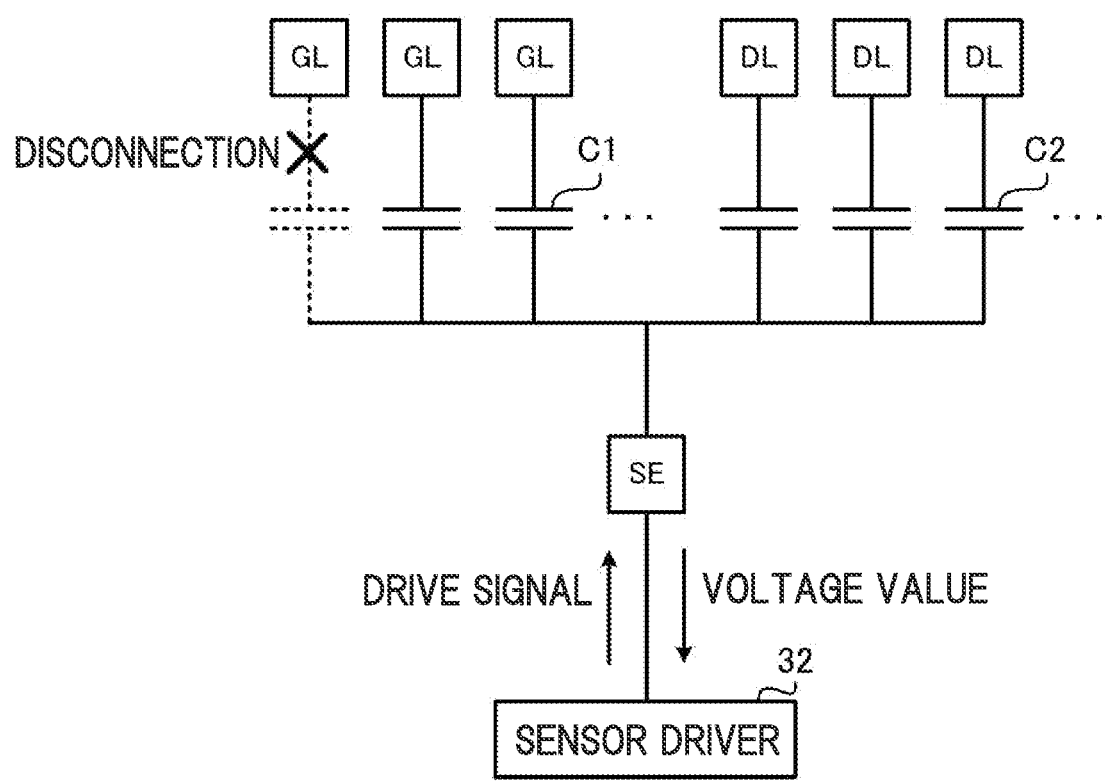
FIG. 12 is a diagram illustrating an equivalent circuit per sensor electrode at the time of disconnection in the first embodiment.

For example, as illustrated in FIG. 11, when disconnection occurs in one gate line GL, the parasitic capacitance C1 formed between the plurality of sensor electrodes SE surrounded by a thick line located ahead of the disconnection portion and the gate line GL is not detected. Therefore, as in the equivalent circuit illustrated in FIG. 12, the parasitic capacitance formed in the sensor electrode SE located ahead of the disconnection portion is reduced by an amount corresponding to the parasitic capacitance C1 between the sensor electrode SE and the gate line GL where the disconnection has occurred. Although FIGS. 11 and 12 illustrate an example in which the disconnection occurs in the gate line GL, the same applies to the case where the disconnection occurs in the data line DL.

The determination unit 39 determines whether the parasitic capacitance C1 or C2 formed in each sensor electrode SE has decreased based on the voltage value detected from each sensor electrode SE when the drive signal is applied. Specifically, the determination unit 39 determines whether the parasitic capacitance C1 or C2 formed in each sensor electrode SE is relatively reduced as compared with the normal state or as compared with the parasitic capacitance C1 or C2 formed in another sensor electrode SE. Then, when the parasitic capacitance C1 or C2 formed in the sensor electrode SE in which the voltage value is detected decreases, the determination unit 39 determines that the voltage value meets the determination criterion.

Specifically, the determination unit 39 monitors the voltage value of each sensor electrode SE when the drive signal is applied. Then, the determination unit 39 measures the charge time of each sensor electrode SE, specifically, the time when the voltage value of each sensor electrode SE in a case where the drive signal is applied rises to a predetermined threshold or more.

Figure 13:
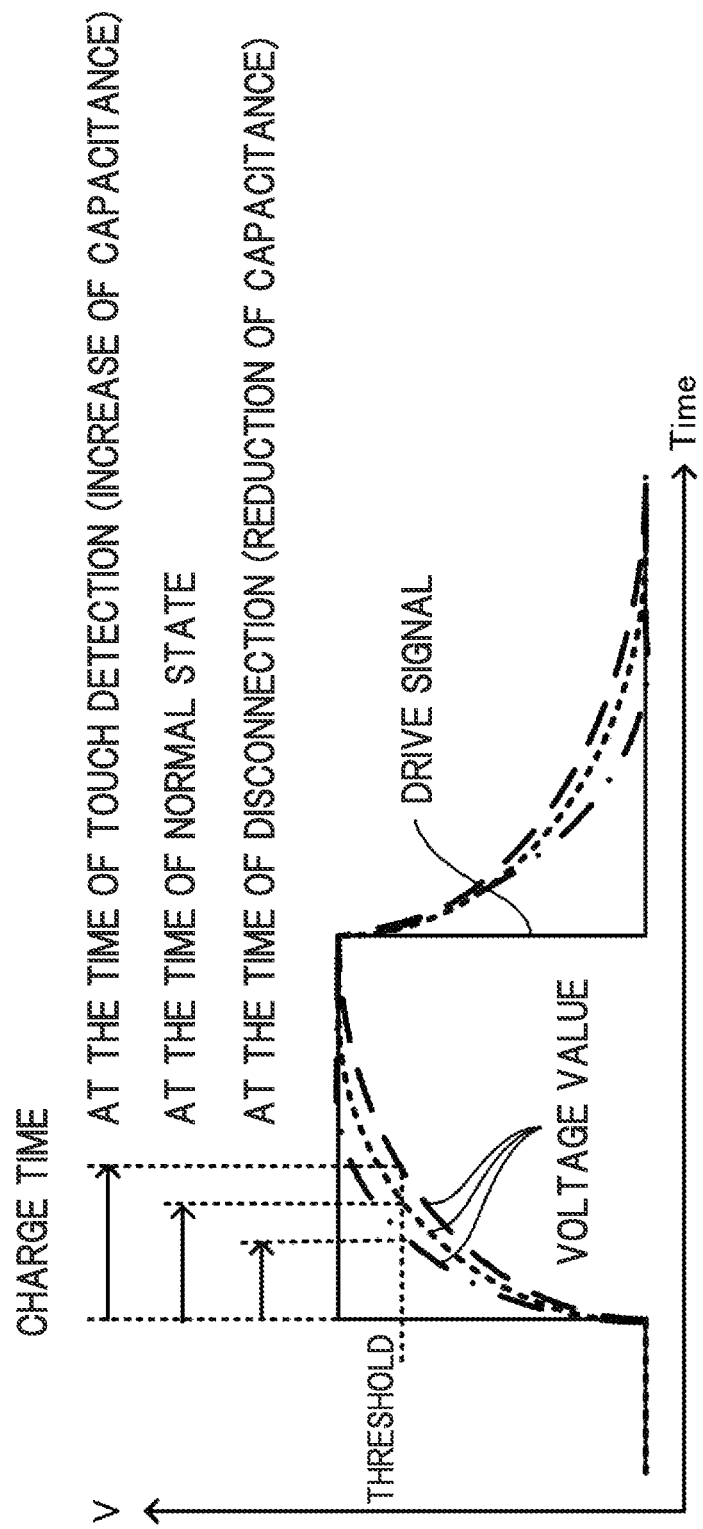
FIG. 13 is a diagram illustrating waveforms of voltage values of a sensor electrode when a drive signal is applied in the first embodiment.

FIG. 13 illustrates a waveform of a voltage value of the sensor electrode SE in a case where a drive signal (a rectangular pulse signal indicated by a solid line) is applied to the sensor electrode SE. In FIG. 13, the waveform of the voltage value of the sensor electrode SE in a normal state, that is, in a case where no touch is made and no disconnection occurs is indicated by a dotted line. Further, a waveform of a voltage value of the sensor electrode SE at the time of touch detection, that is, when the sensor electrode SE is touched by a finger or the like is indicated by a broken line. Further, the waveform of the voltage value of the sensor electrode SE at the time of disconnection, that is, when the disconnection occurs in one of the gate line GL and the data line DL facing the sensor electrode SE is indicated by a broken line.

At the time of touch detection, as illustrated in FIGS. 7 and 8, the parasitic capacitance formed in the sensor electrode SE increases by the amount corresponding to the parasitic capacitance C3 due to the touch as compared with the normal state. Therefore, the charge time by the drive signal is longer than that in the normal state. On the other hand, at the time of disconnection, as illustrated in FIGS. 10 to 12, the parasitic capacitance formed in the sensor electrode SE decreases by the amount corresponding to the parasitic capacitance C1 or C2 of the disconnected gate line or data line as compared with the normal state. Therefore, the charge time by the drive signal is shorter than that in the normal state.

The determination unit 39 determines whether such a charge time is equal to or less than a predetermined determination value (first determination value) for each sensor electrode SE. Then, in a case where the charge time is equal to or less than the determination value, the determination unit 39 determines that the parasitic capacitance C1 or C2 has decreased, and determines that the detection value (voltage value) meets the determination criterion.

In a case where there is the sensor electrode SE whose detection value meets the determination criterion in this manner, the determination unit 39 determines whether the sensor electrodes SE are linearly distributed. Here, the sensor electrodes SE linearly distributed mean that two or more sensor electrodes SE are arranged continuously in the longitudinal direction or the lateral direction (the direction along the gate line GL or the data line DL) among the plurality of sensor electrodes SE arranged in a matrix form. In the example of FIG. 11, as the sensor electrode SE whose detection value meets the determination criterion, three sensor electrodes SE surrounded by a thick line positioned ahead of the disconnection portion are linearly distributed.

When two or more sensor electrodes SE whose detection values meet the determination criterion are linearly distributed, the determination unit 39 determines that a line defect has occurred in the liquid crystal panel 20. Specifically, the determination unit 39 determines that a disconnection has occurred in the liquid crystal drive line facing the sensor electrodes SE, which are linearly distributed, among the plurality of liquid crystal drive lines as the line defect.

For example, when two or more sensor electrodes SE whose detection values meet the determination criterion are linearly distributed in the lateral direction (row direction), the determination unit 39 determines that the disconnection has occurred in any one of the plurality of gate lines GL arranged at the positions facing the sensor electrodes SE. Alternatively, when two or more sensor electrodes SE whose detection values meet the determination criterion are linearly distributed in the longitudinal direction (column direction), the determination unit 39 determines that a disconnection has occurred in any of the plurality of data lines DL arranged at positions facing the sensor electrodes SE.

More specifically, the determination unit 39 determines that a disconnection has occurred in a region of the sensor electrode SE closest to the driver 30 on the line among the two or more sensor electrodes SE linearly distributed as the disconnection portion. As a result, it is possible to specify the location where the disconnection has occurred in units of the size of the sensor electrode SE.

In a case where a touch by a finger or the like is detected, the parasitic capacitance of at least one sensor electrode SE where the touch is detected among the plurality of sensor electrodes SE arranged in a matrix form increases. Therefore, at the time of touch detection, the change in the parasitic capacitance appears in a dotted manner. On the other hand, when the disconnection occurs, the parasitic capacitance of at least one sensor electrode SE arranged along the line in which the disconnection occurs among the plurality of sensor electrodes SE arranged in the matrix form decreases. Therefore, at the time of disconnection, the change in the parasitic capacitance appears linearly. In this manner, it is possible to distinguish between touch and disconnection from the distribution of the sensor electrodes SE in which the parasitic capacitance has changed.

Note that the sensor control unit 37 applies a plurality of drive pulses to each sensor electrode SE as a countermeasure for detection variation due to the influence of external noise or the like. As an example, FIG. 9 illustrates a case where eight drive pulses are applied. Then, the determination unit 39 determines the presence of a line defect based on the detection values for the plurality of drive pulses. Accordingly, the detection accuracy of the line defect can be enhanced.

Figure 14:
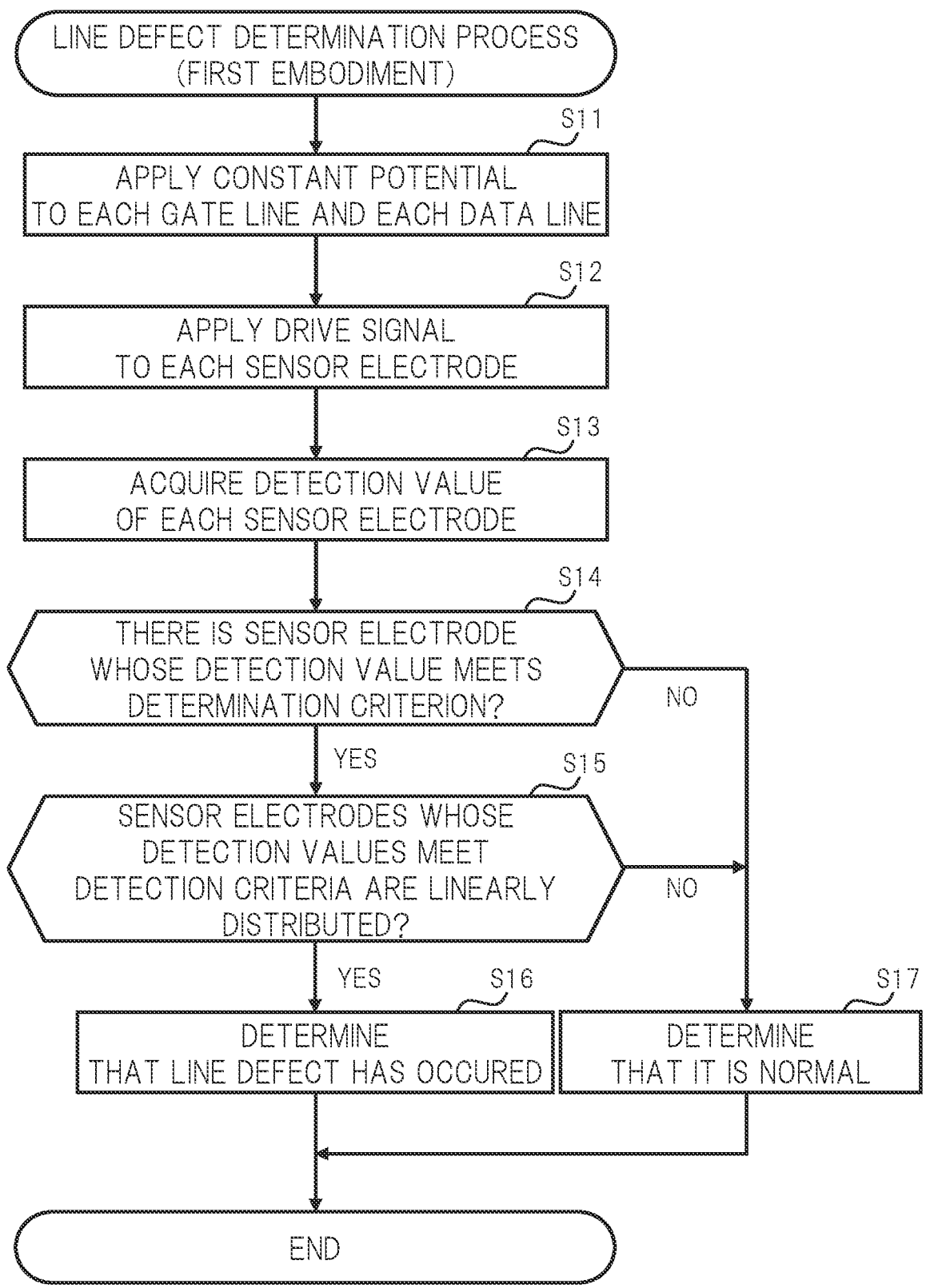
FIG. 14 is a flowchart illustrating a flow of a line defect determination process executed by the liquid crystal display device according to the first embodiment.

Next, a flow of a line defect determination process in the first embodiment will be described with reference to a flowchart illustrated in FIG. 14. The line defect determination process illustrated in FIG. 14 is executed in at least one of a period from the start of the liquid crystal display device 10 to the execution of the first display process and a display blank period.

When the line defect determination process is started, the liquid crystal control unit 35 controls the liquid crystal driver 31 to apply a constant potential to each gate line GL and each data line DL (step S11). Specifically, in order to apply a potential as far as possible from the drive signal applied to the sensor electrode SE, the liquid crystal control unit 35 applies the off-potential VGL to each gate line GL and applies the maximum potential or the minimum potential to each data line DL.

In this state, the sensor control unit 37 controls the sensor driver 32 to apply a row of drive pulses to each sensor electrode SE as a drive signal (step S12). Then, the sensor control unit 37 acquires a detection value of each sensor electrode SE with respect to the applied drive signal (step S13).

When the detection value of each sensor electrode SE is acquired, the determination unit 39 determines whether there is a sensor electrode SE whose acquired detection value meets the determination criterion (step S14). Specifically, the determination unit 39 monitors of the voltage value of each sensor electrode SE. Then, the determination unit 39 determines whether the charge time during which each sensor electrode SE is charged to a threshold value or more is a predetermined determination value or less.

In a case where there is a sensor electrode SE whose detection value meets the determination criterion (step S14; YES), the determination unit 39 further determines whether the sensor electrodes SE whose detection values meet the determination criteria are linearly distributed (step S15). When the sensor electrodes SE whose detection values meet the determination criterion are linearly distributed (step S15; YES), the determination unit 39 determines that a line defect has occurred (step S16). Specifically, the determination unit 39 determines that any one of gate lines GL and data lines DL passing through positions facing two or more sensor electrodes SE linearly distributed is disconnected.

On the other hand, when there is no sensor electrode SE whose detection value meets the determination criterion (step S14; NO), the determination unit 39 determines that it is normal, that is, no line defect has occurred (step S17). Further, when the sensor electrodes SE whose detection values meet the determination criterion are not linearly distributed (step S15; NO), the determination unit 39 determines that it is normal. Thus, the line defect determination process illustrated in FIG. 14 ends.

As described above, in the line defect determination process, the liquid crystal display device 10 according to the first embodiment applies the drive signal to each sensor electrode SE, and determines whether the detection value detected from each sensor electrode SE when the drive signal is applied meets the predetermined determination criterion. The liquid crystal display device 10 determines that the line defect has occurred when sensor electrodes SE whose detection values meet the determination criterion are linearly distributed among the plurality of sensor electrodes SE.

As described above, since the liquid crystal display device 10 according to the first embodiment determines the presence of the line defect based on the detection value detected from each sensor electrode SE, the line defect determination process can be executed using the same circuit as the touch detection process. Therefore, the line defect in liquid crystal display device 10 can be detected with a simple configuration.

In particular, the line defect is a defect that accounts for nearly half of defects occurred in the liquid crystal module, and is easily visually recognized and detected as a clear abnormality on display. However, a load change of the drive circuit due to the line defect is slight, and it is not easy to detect the line defect due to the load change. In the first embodiment, attention is paid to the fact that the parasitic capacitances C1 and C2 between the sensor electrode SE and the liquid crystal drive line change between the normal state and the disconnection time, and a slight change in capacitance is detected using the detection circuit of the touch panel. Thus, the line defect in the liquid crystal display device 10 can be detected without providing a special circuit for detecting the line defect. In addition, since it is not necessary to provide a special circuit for detecting a line defect, it is not necessary to provide a new wiring region connecting the detection circuit to the data line DL and the gate line GL, and thus, it is also possible to prevent an increase in the outer shape of the liquid crystal panel 20.

Second Embodiment

Next, a second embodiment will be described. Configurations and functions similar to those of the first embodiment will not be described as appropriate.

In the method of the first embodiment described above, the disconnection can be detected in units of the size of the sensor electrode SE, but it is difficult to determine which line among the plurality of liquid crystal drive lines arranged at the position facing the sensor electrode SE is disconnected. In addition, in the method of the first embodiment, disconnection can be detected, but it is difficult to detect a short-circuit between lines. On the other hand, the liquid crystal display device 10 of the second embodiment detects the disconnection and the short-circuit as the line defect in each line.

Figure 15:
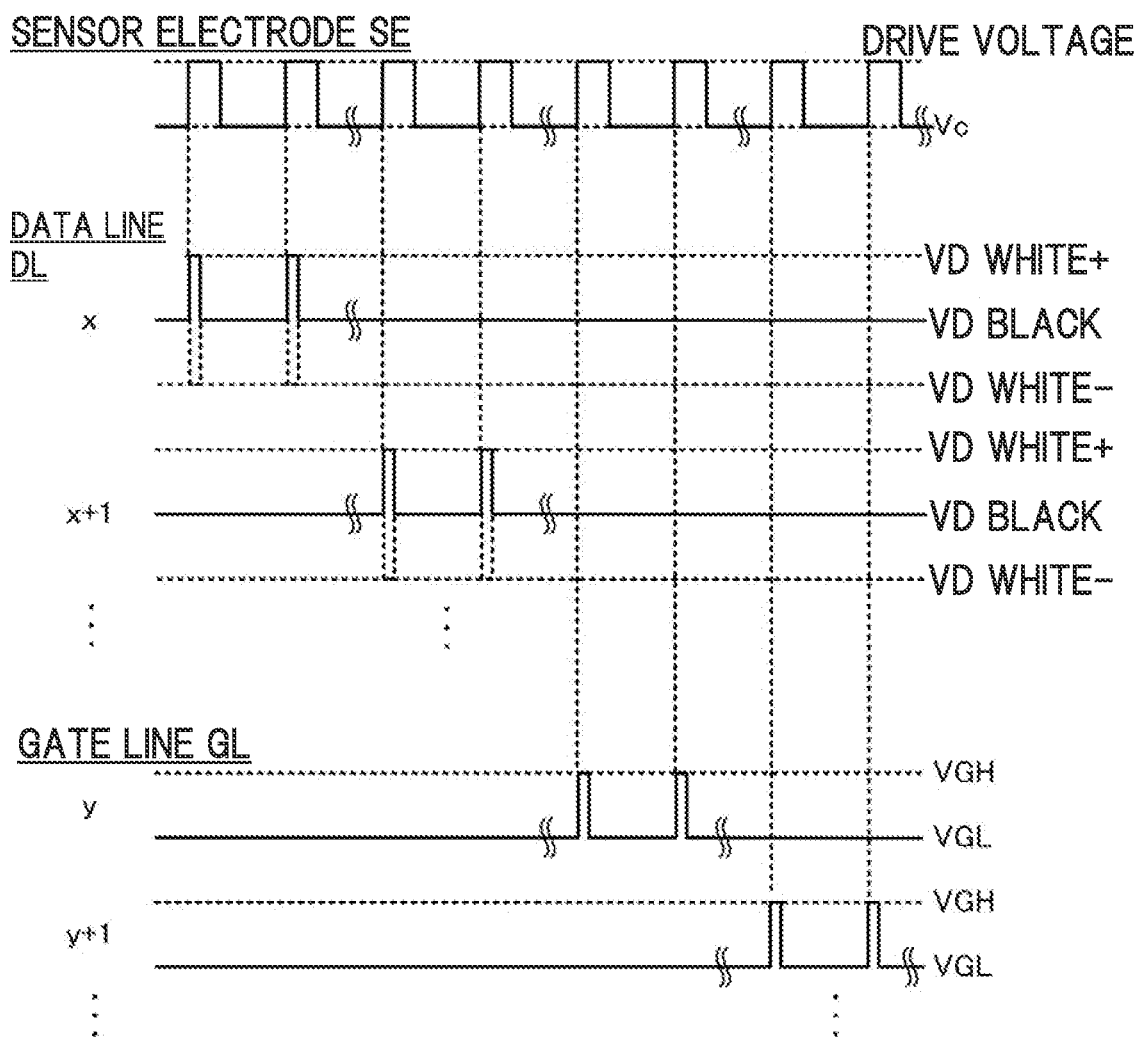
FIG. 15 is a timing chart of a line defect determination process executed by a liquid crystal display device according to a second embodiment.

FIG. 15 is a timing chart of signals applied to the sensor electrode SE, gate line GL, and data line DL in the line defect determination process in the second embodiment.

When the line defect determination process is executed, the sensor control unit 37 applies a drive signal to each sensor electrode SE as in the first embodiment. Similarly to the touch detection process, the sensor control unit 37 applies the drive pulse of the positive polarity to each of the plurality of sensor electrodes SE provided in the liquid crystal panel 20 in parallel, that is, simultaneously at the same timing.

On the other hand, in the line defect determination process, the liquid crystal control unit 35 varies the potentials of the gate lines GL and data lines DL one by one at timing synchronized with the drive signal applied to each sensor electrode SE. Specifically, the liquid crystal control unit 35 varies the potential by applying the pulse signal to each gate line GL and each data line DL.

More specifically, the liquid crystal control unit 35 sequentially applies the pulse signal of the on-potential VGH to each gate line GL, and sequentially applies the pulse signal of the white potential (the maximum potential or the minimum potential) to each data line DL. The liquid crystal control unit 35 grasps the timing at which the sensor control unit 37 applies the drive signal to each sensor electrode SE based on the synchronization signal output from the sensor control unit 37.

When a drive signal is applied to each sensor electrode SE, the sensor control unit 37 acquires a detection value detected from each sensor electrode SE when the drive signal is applied. Specifically, the sensor control unit 37 acquires a voltage value of each sensor electrode SE detected by the sensor driver 32 as a detection value, and outputs the voltage value to the determination unit 39.

In the line defect determination process, the determination unit 39 determines whether the detection value of each sensor electrode SE at the timing when the potential of opposing gate lines GL or data lines DL is varied meets a predetermined determination criterion. In the second embodiment, the determination criterion is a criterion indicating that the potential variation in the liquid crystal drive line is reduced or eliminated due to disconnection or short-circuit.

Figure 16:
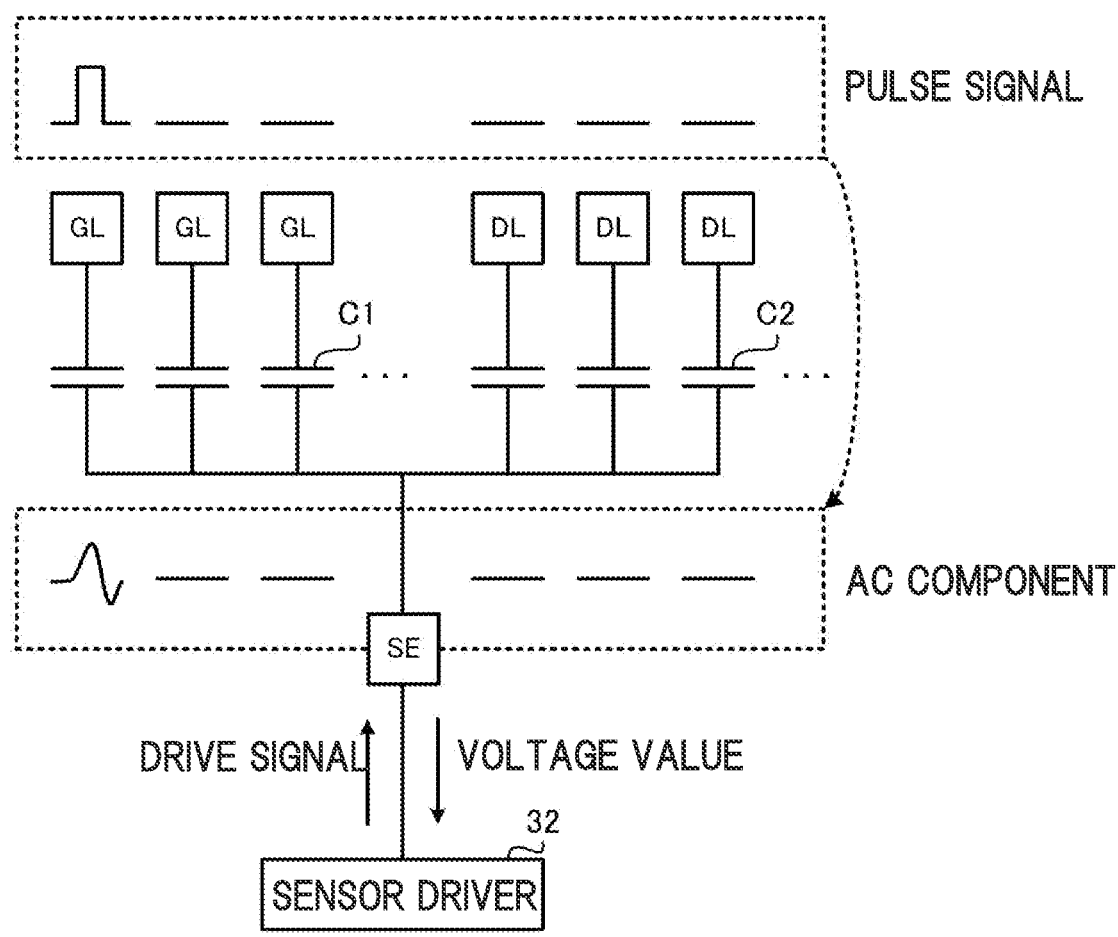
FIG. 16 is a diagram illustrating an equivalent circuit per sensor electrode in a normal state in the second embodiment.

FIG. 16 illustrates an equivalent circuit per sensor electrode SE in a case where neither disconnection nor short-circuit occurs. When a pulse signal is applied to any one of the gate line GL and data line DL, an AC (Alternative Current) component of potential variation caused by the pulse signal passes through the parasitic capacitance C1 or C2, and flows to the sensor electrode SE arranged at a position facing the gate line GL or data line DL to which the pulse signal is applied. As a result, the voltage value of the sensor electrode SE varies under the influence of the AC component passing through the parasitic capacitance C1 or C2.

Figure 17:
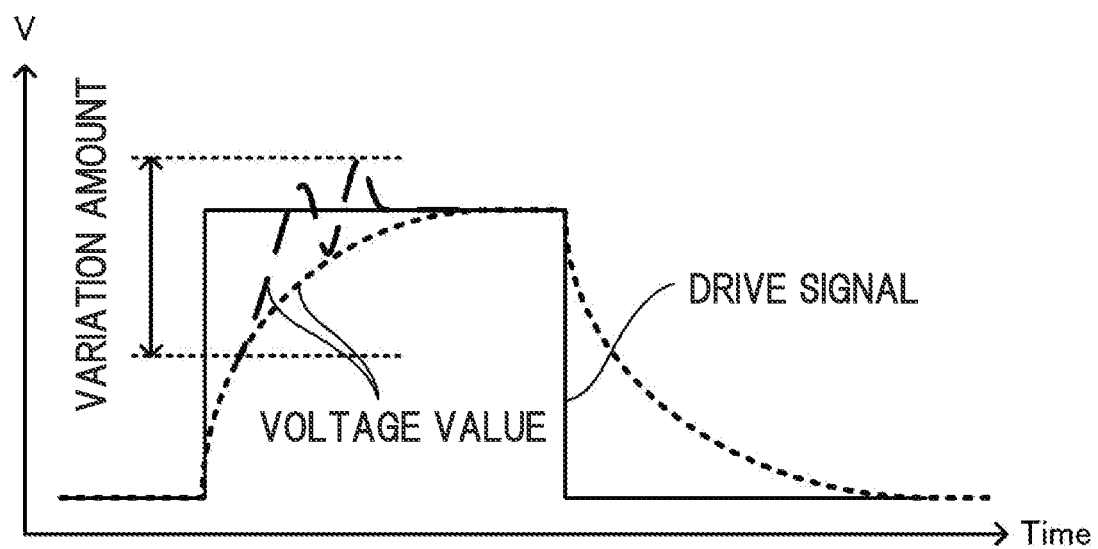
FIG. 17 is a diagram illustrating waveforms of voltage values of a sensor electrode when a drive signal is applied in the second embodiment.

FIG. 17 illustrates a waveform of a voltage value when a drive signal (a rectangular pulse signal indicated by a solid line) is applied to the sensor electrode SE. In FIG. 17, the waveform of the voltage value of the sensor electrode SE in the normal state, that is, when there is no potential variation in any of the opposing electrodes of the sensor electrode SE is indicated by a dotted line. On the other hand, the waveform of the voltage value of the sensor electrode SE when there is a potential variation in any of the opposing electrodes of the sensor electrode SE is indicated by a broken line. The opposing electrodes of the sensor electrode SE means the electrodes at the plurality of gate lines GL and the plurality of data lines DL passing through the position facing the sensor electrode SE.

When the potential of the opposing electrodes of the sensor electrode SE varies, as indicated by a broken line in FIG. 17, the voltage value of the sensor electrode SE varies under the influence of the AC component that has passed through the parasitic capacitance C1 or C2 as compared with the normal state. The determination unit 39 determines the presence of disconnection or short-circuit based on the variation amount of the voltage value of the sensor electrode SE at the time of such a potential variation of the opposing electrodes.

Figure 18:
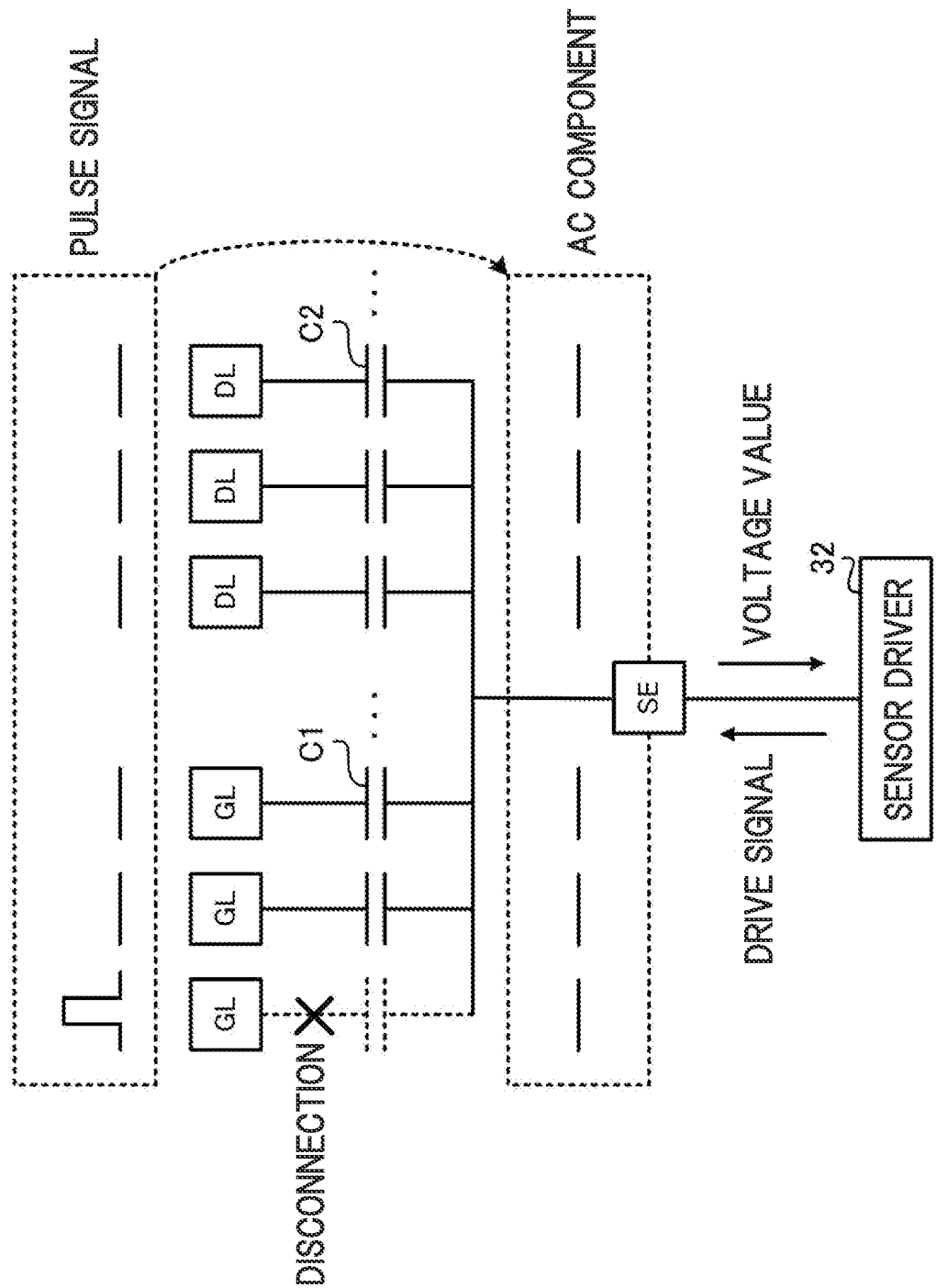
FIG. 18 is a diagram illustrating an equivalent circuit per sensor electrode at the time of disconnection in the second embodiment.

For example, as illustrated in FIG. 18, in the case that the disconnection has occurred in either the gate line GL or the data line DL, the charge moves from the liquid crystal driver 31 to the disconnection portion, but the charge does not move from the disconnection portion. Therefore, even if the pulse signal is applied to the disconnected gate line GL or data line DL, the pulse signal does not reach beyond the disconnection portion. In this case, since there is no AC component passing through the parasitic capacitance C1 or C2, the waveform of the voltage value of the sensor electrode SE is similar to that in the normal state.

Figure 19:
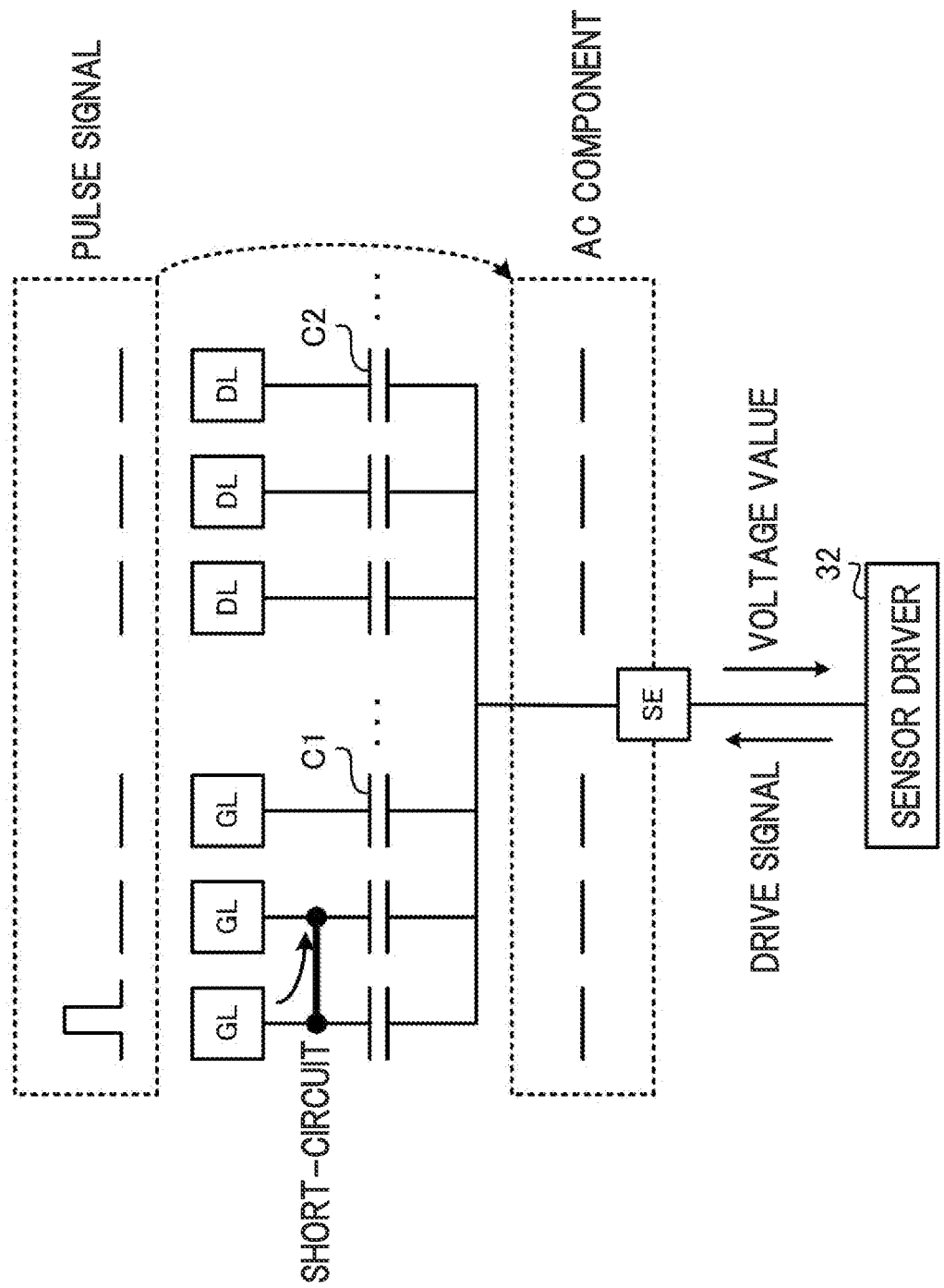
FIG. 19 is a diagram illustrating an equivalent circuit per sensor electrode at the time of short-circuit in the second embodiment.

On the other hand, as illustrated in FIG. 19, when the short-circuit occurs in any one of the gate lines GL and data lines DL, the potential variation due to the pulse signal applied to the gate line GL or data line DL is inhibited by the short-circuit. Therefore, the AC component passing through the parasitic capacitance C1 or C2 slows down or disappears as compared with the case where the pulse signal is applied to the normal line. As a result, the variation amount of the voltage value of the sensor electrode SE decreases and becomes close to that in the normal state.

FIGS. 18 and 19 illustrate an example in which the disconnection or the short-circuit occurs in the gate line GL, but the same applies to the case where the short-circuit or disconnection occurs in the data line DL. The short-circuit determined by determination unit 39 is not limited to the short-circuit between two gate lines GL or the short-circuit between two data lines DL, but may be a short-circuit between the gate line GL and data line DL, a short-circuit between the gate line GL or data line DL and a COM electrode (common electrode), or the like. Here, the COM electrode is a common electrode to which an intermediate potential necessary for liquid crystal driving is applied.

The determination unit 39 measures such a variation amount of the voltage value for each sensor electrode SE provided at a position facing the liquid crystal drive line whose potential is varied by the pulse signal. Specifically, the determination unit 39 measures a difference from a normal voltage value or a difference from a voltage value of another sensor electrode SE as a variation amount of the voltage value of each sensor electrode SE.

Then, the determination unit 39 determines whether the variation amount of the voltage value of each sensor electrode SE is equal to or less than a predetermined determination value (second determination value). As a result of the determination, when the variation amount is equal to or less than the determination value, the determination unit 39 determines that the potential variation in the liquid crystal drive line has been reduced or eliminated due to disconnection or short-circuit, and determines that the detection value (voltage value) meets the determination criterion.

In a case where there is the sensor electrode SE whose detection value meets the determination criterion in this manner, the determination unit 39 determines whether the sensor electrodes SE are linearly distributed. In a case where two or more sensor electrodes SE whose detection values meet the determination criterion are linearly distributed along the direction in which the liquid crystal drive line having the varied potential is arranged, the determination unit 39 determines that a disconnection or a short-circuit has occurred in the liquid crystal drive line having the varied potential.

On the other hand, when the variation amount is larger than the determination value, that is, when the detection value of the sensor electrode SE indicates variation due to potential variation of the liquid crystal drive line, the determination unit 39 determines that the detection value does not meet the determination criterion. In this case, the determination unit 39 determines that the liquid crystal drive line is normal, and no disconnection or short-circuit occurs.

In the line defect determination process, the control unit 33 applies a pulse signal to each of the liquid crystal drive lines (the gate line GL or the data line DL) to execute an individual determination process for determining whether there is a disconnection or a short-circuit for each of the liquid crystal drive lines. Consequently, the control unit 33 determines whether the disconnection or the short-circuit has occurred in units of the liquid crystal drive lines.

In the line defect determination process, the liquid crystal control unit 35 applies a plurality of drive pulses to one liquid crystal drive line (gate line GL or data line DL) as a countermeasure against the detection variation due to the influence of external noise or the like. Then, the determination unit 39 determines the presence of a line defect based on the voltage values for the plurality of drive pulses. Accordingly, the detection accuracy of the line defect can be enhanced. Here, in order to avoid complexity, FIG. 15 illustrates a case where two drive pulses are applied per one liquid crystal drive line, but the liquid crystal control unit 35 may apply eight drive pulses per one liquid crystal drive line, for example.

In addition, when the pulse signal is applied to the gate line GL, the display may deteriorate due to the potential variation of the gate line GL. Therefore, except for the case that the display does not deteriorate due to the potential variation of gate line GL, the line defect determination process in the second embodiment is hardly executed in the display blank period. Further, in the line defect determination process in the second embodiment, the pulse signal is sequentially applied to each gate line GL and each data line DL one by one, so that the processing time is required as compared with the line defect determination process in the first embodiment. Therefore, the line defect determination process in the second embodiment is preferably executed during a period from when the liquid crystal display device 10 is activated to when the first display process is executed.

Figure 20:
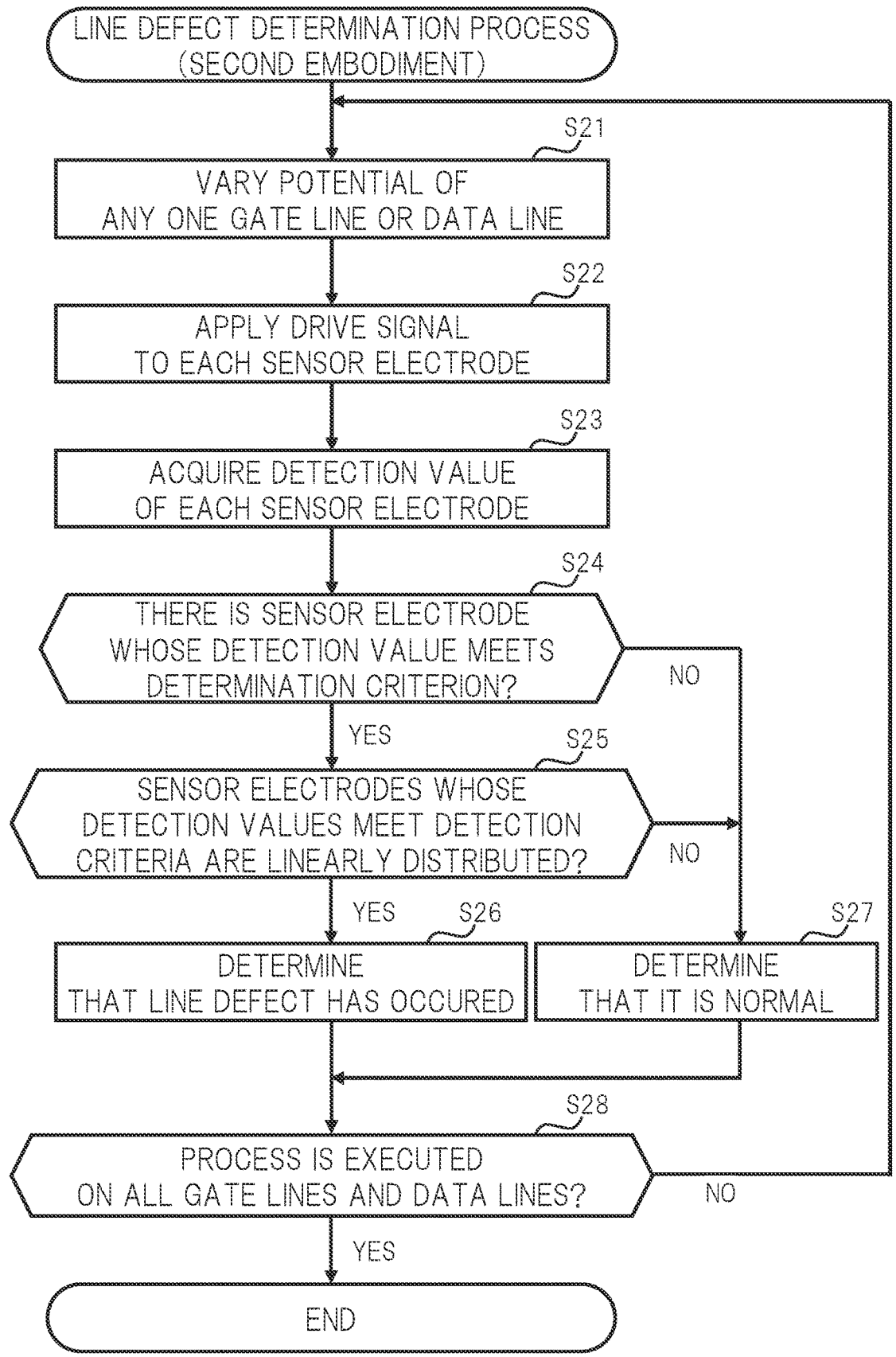
FIG. 20 is a flowchart illustrating a flow of a line defect determination process executed by the liquid crystal display device according to the second embodiment.

Next, a flow of a line defect determination process in the second embodiment will be described with reference to a flowchart illustrated in FIG. 20.

When the line defect determination process is started, the liquid crystal control unit 35 controls the liquid crystal driver 31 to vary the potential of any one gate line GL or data line DL (step S21). Specifically, the liquid crystal control unit 35 selects one of the plurality of gate lines GL and the plurality of data lines DL, and applies the pulse signal to the selected line.

At a timing synchronized with the application of the pulse signal, the sensor control unit 37 controls the sensor driver 32 to apply a row of drive pulses to each sensor electrode SE as a drive signal (step S22). Then, the sensor control unit 37 acquires a detection value of each sensor electrode SE with respect to the applied drive signal (step S23).

When the detection value of each sensor electrode SE is acquired, the determination unit 39 determines whether there is a sensor electrode SE whose acquired detection value meets the determination criterion (step S24). Specifically, the determination unit 39 determines whether the variation amount of the voltage value of each sensor electrode SE provided at the position facing the gate line GL or the data line DL in which the potential is varied is equal to or less than the determination value.

In a case where there is a sensor electrode SE whose detection value meets the determination criterion (step S24; YES), the determination unit 39 further determines whether two or more sensor electrodes SE whose detection values meet the determination criterion are linearly distributed along the direction of the selected gate line GL or data line DL (step S25).

When two or more sensor electrodes SE whose detection values meet the determination criterion are linearly distributed along the direction of the selected gate line GL or data line DL (step S25; YES), the determination unit 39 determines that the line defect has occurred in the selected gate line GL or data line DL (step S26).

On the other hand, when there is no sensor electrode SE whose detection value meets the determination criterion (step S24; NO), the determination unit 39 determines that the selected gate line GL or data line DL is normal, namely, the line defect has not occurred (step S27). Further, when the sensor electrodes SE whose detection values meet the determination criterion are not linearly distributed (step S25; NO), the determination unit 39 determines that the selected gate line GL or data line DL is normal.

Next, the control unit 33 determines whether the processing is performed on all gate lines GL and data lines DL (step S28). When there is an unprocessed gate line GL or data line DL (step S28; NO), the control unit 33 newly selects one unprocessed gate line GL or data line DL, and returns the processing to step S21. Then, the control unit 33 executes the processing of steps S21 to S27 on one newly selected line. In this way, the control unit 33 determines the presence of the line defect one by one for all gate lines GL and data lines DL.

Finally, when the processing is performed on all gate lines GL and data lines DL (step S28; YES), the line defect determination process illustrated in FIG. 20 ends.

As described above, the liquid crystal display device 10 according to the second embodiment varies the potential of one of the plurality of liquid crystal drive lines at the timing synchronized with the drive signal applied to each sensor electrode SE, and determines that the disconnection or the short-circuit occurs in the liquid crystal drive line when the detection value of the sensor electrode SE facing the liquid crystal drive line meets the determination criterion. The liquid crystal display device 10 of the second embodiment executes such an individual determination process on each liquid crystal drive line.

As described above, the liquid crystal display device 10 according to the second embodiment determines the presence of the line defect for each of the plurality of liquid crystal drive lines, and thus it takes more time than the line defect determination process of the first embodiment, but the presence of the line defect can be determined in units of individual liquid crystal drive lines. In addition, the presence of not only the disconnection but also the short-circuit can be determined as the line defect.

The control unit 33 is not limited to performing the line defect determination process in the second embodiment on all gate lines GL and data lines DL. For example, after detecting a line defect in units of the size of the sensor electrode SE by the line defect determination process in the first embodiment, the control unit 33 may execute the line defect determination process in the second embodiment. Specifically, the control unit 33 first determines that the line defect has occurred in any of the plurality of liquid crystal drive lines facing two or more sensor electrodes SE whose detection values meet the determination criteria by the line defect determination process in the first embodiment. Thereafter, the control unit 33 secondly executes the individual determination process in the second embodiment on each of the plurality of liquid crystal drive lines, and specifies the liquid crystal drive line in which the line defect occurs from among the plurality of liquid crystal drive lines. As a result, the time for detecting the line defect in units of lines can be shortened.

Furthermore, the control unit 33 may change the condition of the potential variation one by one by applying pulse signals under different conditions to a plurality of liquid crystal drive lines facing the same sensor electrode SE. As a result, even if the pulse signal is applied to the plurality of liquid crystal drive lines facing the same sensor electrode SE at the same timing, it is possible to distinguish which liquid crystal drive line of the plurality of liquid crystal drive lines has the influence on the voltage value of the sensor electrode SE when the drive signal is applied due to the potential variation. Therefore, the detection time of the line defect can be shortened as compared with the case where the pulse signal is sequentially applied to all the liquid crystal drive lines one by one.

Third Embodiment

Next, a third embodiment will be described. Configurations and functions similar to those in the first and second embodiments will not be described as appropriate.

In the method of the first embodiment described above, disconnection can be detected in a short time, but it is difficult to detect a short-circuit of the line. On the other hand, the liquid crystal display device 10 of the third embodiment detects a short-circuit between the lines of the same kind, specifically, a short-circuit between two gate lines GL and a short-circuit between two data lines DL.

Figure 21:
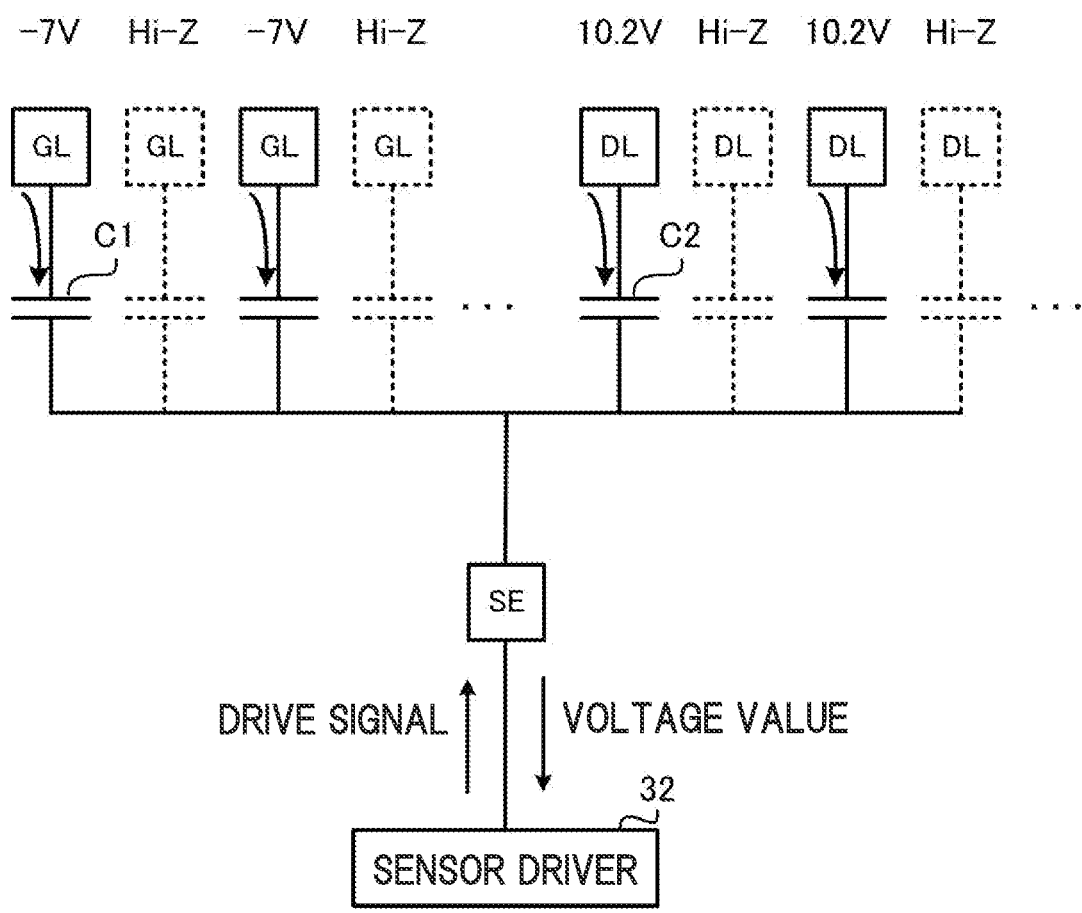
FIG. 21 is a diagram illustrating an equivalent circuit per sensor electrode in a third embodiment.

FIG. 21 illustrates an equivalent circuit per sensor electrode SE in the line defect determination process of the third embodiment. The liquid crystal control unit 35 sets every other one of the plurality of liquid crystal drive lines (gate line GL and data line DL) to the high-impedance (Hi-Z) state. Here, the high-impedance state means a state showing a high resistance to an electric signal.

The liquid crystal driver 31 has a function of separating each of the plurality of liquid crystal drive lines from other lines. The liquid crystal control unit 35 controls the liquid crystal driver 31 to separate every other gate line GL and data line DL from the other lines, thereby setting the high-impedance state.

The liquid crystal control unit 35 applies a constant potential to the other liquid crystal drive lines that are not in the high-impedance state, as in the first embodiment. Specifically, the liquid crystal control unit 35 applies the potential of off-potential VGL (for example, −7 V) to each gate line GL that is not in the high-impedance state. In addition, the liquid crystal control unit 35 applies a positive white potential (maximum potential, e.g. 10.2 V) or a negative white potential (minimum potential, e.g. 0.2 V) to each data line DL that is not set to the high-impedance state. Although FIG. 21 illustrates an example in which the positive white potential (10.2 V) is applied, which of the positive white potential and the negative white potential is applied depends on the polarity of the data line DL.

In this way, when every other gate line GL and data line DL are set to the high-impedance state and a constant potential is applied to the other lines, the sensor control unit 37 applies a drive signal to each sensor electrode SE. As in the first embodiment, the sensor control unit 37 applies a positive drive pulse to each of the plurality of sensor electrodes SE provided in the liquid crystal panel 20 in parallel, that is, at the same timing.

When a drive signal is applied to each sensor electrode SE, the sensor control unit 37 acquires a detection value detected from each sensor electrode SE when the drive signal is applied. Specifically, the sensor control unit 37 acquires the voltage value of each sensor electrode SE when the drive signal is applied as the detection value, and outputs the acquired voltage value to the determination unit 39.

The determination unit 39 determines whether the detection value of each sensor electrode SE with respect to the drive signal meets a predetermined determination criterion. In the third embodiment, the determination criterion is a criterion indicating that the parasitic capacitance C1 or C2 formed in the sensor electrode SE is increased due to a short-circuit.

More specifically, the parasitic capacitance C1 or C2 is formed between each sensor electrode SE and the gate line GL and data line DL to which a constant potential is applied. On the other hand, since no charge is supplied to the gate line GL and data line DL in the high-impedance state, the parasitic capacitance C1 or C2 is not formed between each sensor electrode SE and the gate line GL and data line DL in the high-impedance state.

Figure 22:
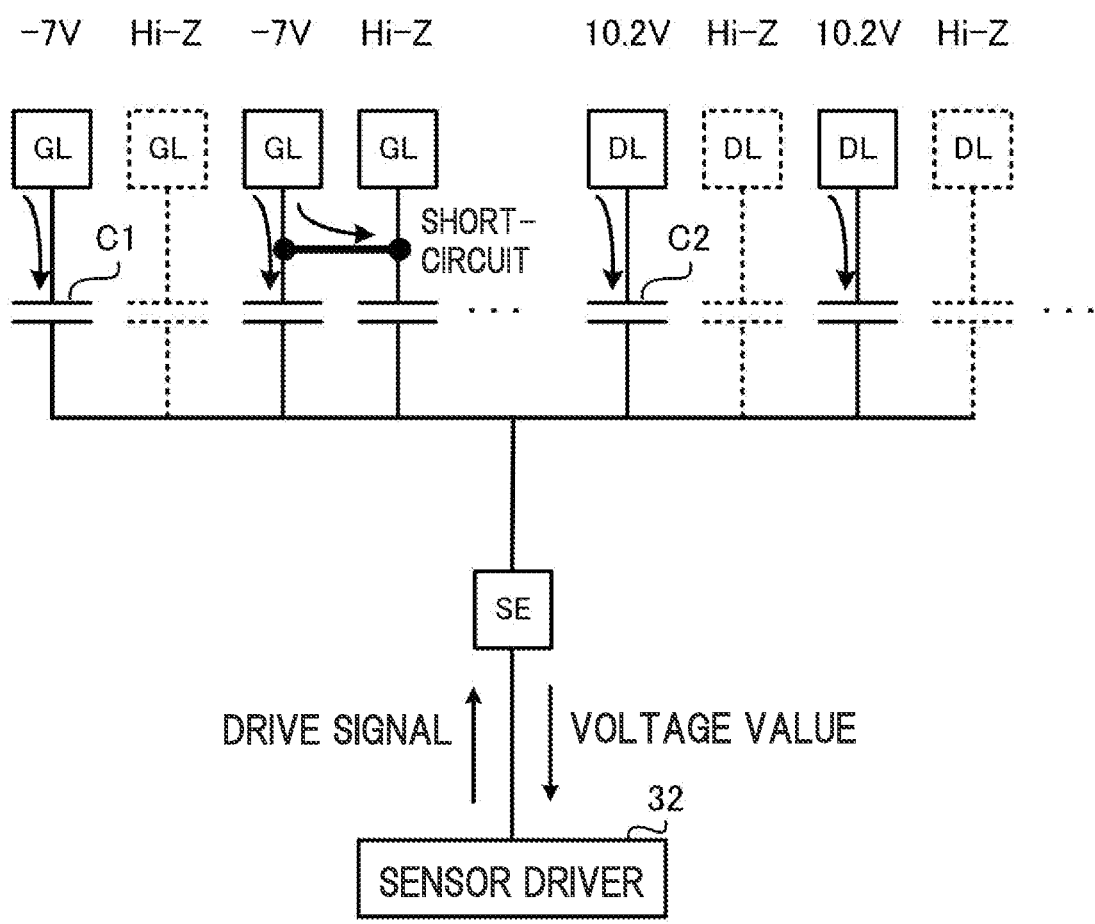
FIG. 22 is a diagram illustrating an equivalent circuit per sensor electrode at the time of short-circuit in the third embodiment.

Here, as illustrated in FIG. 22, when a short-circuit occurs between two gate lines GL, charges are supplied from the data line DL to which a constant potential is applied to the data line DL in the high-impedance state. Therefore, the parasitic capacitances C1 and C2 formed in the sensor electrode SE at the position facing two short-circuited gate lines GL increase by the amount corresponding to one parasitic capacitance C1. Similarly, when a short-circuit occurs between the two data lines DL, the parasitic capacitances C1 and C2 formed in the sensor electrode SE at positions facing the two short-circuited data lines DL increase by the amount corresponding to one parasitic capacitance C2.

The determination unit 39 determines whether the parasitic capacitance C1 or C2 formed in each sensor electrode SE has increased based on the voltage value detected from each sensor electrode SE when the drive signal is applied. Specifically, the determination unit 39 determines whether the parasitic capacitance C1 or C2 formed in each sensor electrode SE is relatively increased as compared with the normal state under the same condition (that is, a condition that every other liquid crystal drive line is set to the high-impedance state) or as compared with the parasitic capacitance C1 or C2 formed in another sensor electrode SE under the same condition. Then, when the parasitic capacitance C1 or C2 formed in the sensor electrode SE in which the voltage value is detected increases, the determination unit 39 determines that the voltage value meets the determination criterion.

As in the first embodiment, the determination unit 39 monitors the voltage value of each sensor electrode SE when the drive signal is applied, and measures the charge time. The determination unit 39 determines whether the charge time is a determination value (third determination value) or more for each sensor electrode SE. Then, in a case where the charge time is the determination value or more, the determination unit 39 determines that the parasitic capacitance C1 or C2 has increased, and determines that the detection value (voltage value) meets the determination criterion.

In a case where there are the sensor electrodes SE whose detection values meet the determination criterion as described above, the determination unit 39 determines whether the sensor electrodes SE are linearly distributed as in the first embodiment. When two or more sensor electrodes SE whose detection values meet the determination criterion are distributed linearly, the determination unit 39 determines that a short-circuit occurs in the gate line GL or data line DL facing the sensor electrodes SE distributed linearly. Specifically, the determination unit 39 determines, as the short-circuit, that the short-circuit occurs between the lines of the same type, namely, the short-circuit occurs between two gate lines GL or the short-circuit occurs between two data lines DL.

As described above, the liquid crystal display device 10 according to the third embodiment applies the drive signal to each sensor electrode SE when every other liquid crystal drive line among the plurality of liquid crystal drive lines is in the high-impedance state, and determines the presence of the short-circuit based on the detection value detected from each sensor electrode SE at that time. As a result, a short-circuit between the same type of lines can be detected in a short time in units of the size of the sensor electrode SE.

The line defect determination process in the third embodiment is difficult to execute during the display blank period because the gate line GL needs to be driven. Therefore, the control unit 33 executes the line defect determination process in the third embodiment, for example, in a period from when the liquid crystal display device 10 is started to when the first display process is started.

Fourth Embodiment

Next, a fourth embodiment will be described. Configurations and functions similar to those in the first to third embodiments will not be described as appropriate.

In the method of the third embodiment described above, a short-circuit between lines of the same type is detected. On the other hand, the liquid crystal display device 10 of the fourth embodiment detects a short-circuit between different types of lines, specifically, a short-circuit between the gate line GL and data line DL, a short-circuit between the gate line GL and the COM electrode, and a short-circuit between the data line DL and the COM electrode.

Figure 23:
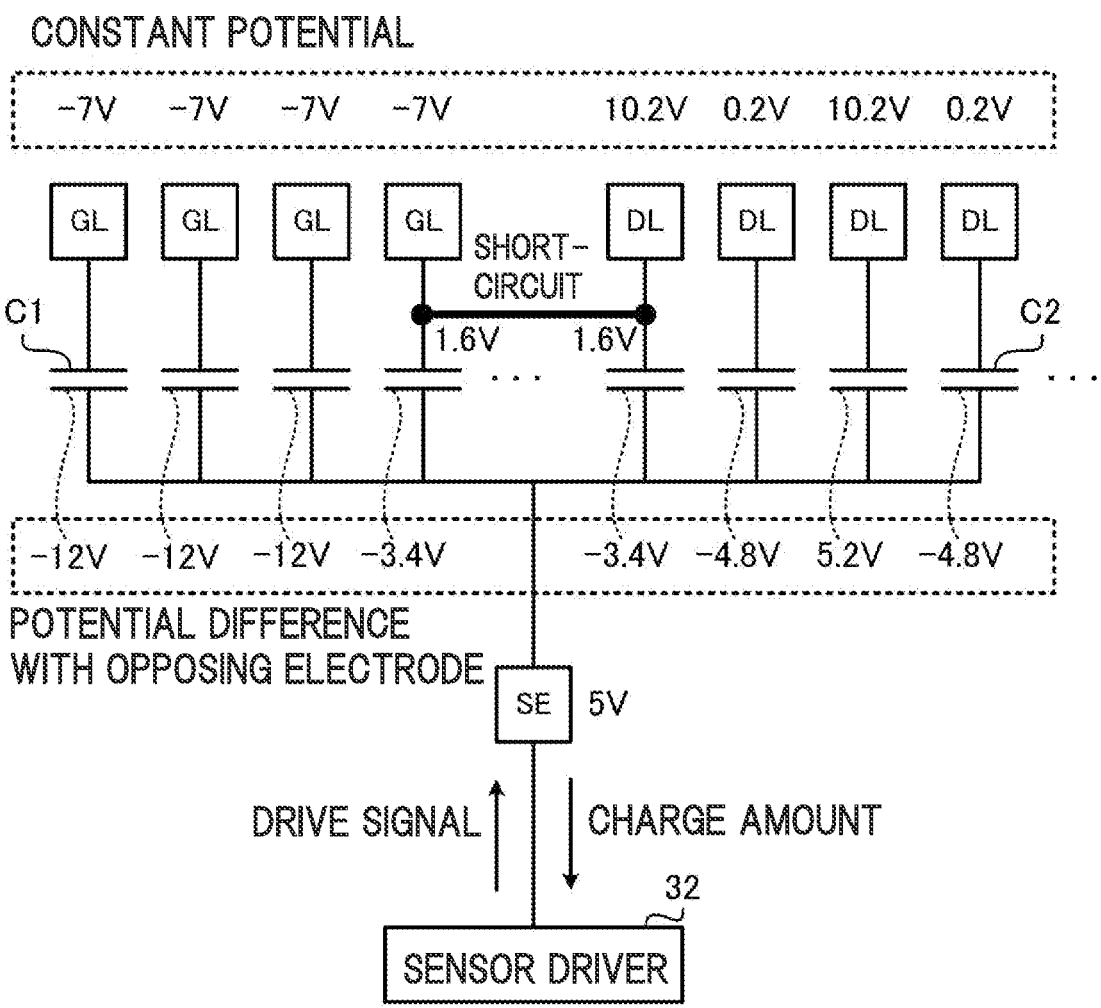
FIG. 23 is a diagram illustrating an equivalent circuit per sensor electrode at the time of short-circuit in a fourth embodiment.

FIG. 23 illustrates an equivalent circuit per sensor electrode SE in the line defect determination process of the fourth embodiment. The liquid crystal control unit 35 applies a constant potential to each liquid crystal drive line similarly to the first embodiment. Specifically, the liquid crystal control unit 35 applies the potential of off-potential VGL (for example, −7 V) to each gate line GL. In addition, the liquid crystal control unit 35 applies a positive white potential (maximum potential, e.g. 10.2 V) or a negative white potential (minimum potential, e.g. 0.2 V) to each data line DL.

When a constant potential is applied to each gate line GL and each data line DL as described above, the sensor control unit 37 applies a drive signal to each sensor electrode SE. As in the first embodiment, the sensor control unit 37 applies a positive drive pulse to each of the plurality of sensor electrodes SE provided in the liquid crystal panel 20 in parallel, that is, at the same timing.

When a drive signal is applied to each sensor electrode SE, the sensor control unit 37 acquires a detection value of each sensor electrode SE with respect to the drive signal. Here, in the first to third embodiments, the sensor control unit 37 acquires the voltage value of each sensor electrode SE as the detection value. On the other hand, in the fourth embodiment, the sensor control unit 37 acquires the charge amount of each sensor electrode SE as the detection value.

Figure 24:
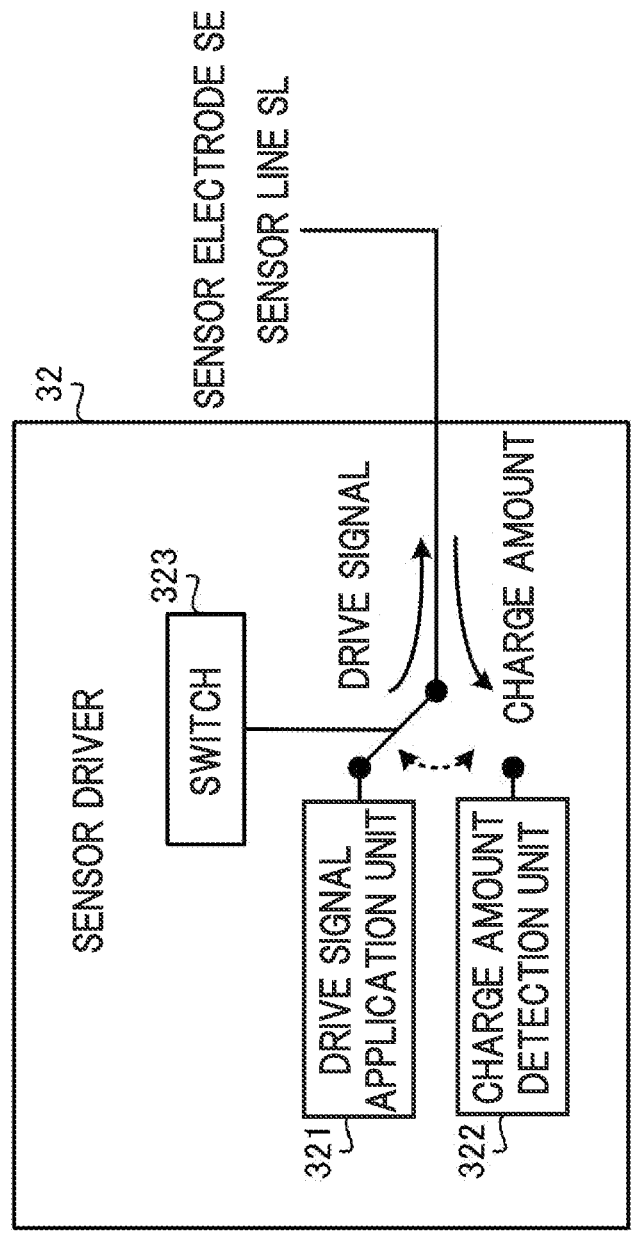
FIG. 24 is a diagram illustrating a configuration of a sensor driver in the fourth embodiment.

FIG. 24 illustrates a configuration of the sensor driver 32 according to the fourth embodiment. The sensor driver 32 includes a drive signal application unit 321, a charge amount detection unit 322, and a switch 323. The drive signal application unit 321 applies a drive signal to each sensor electrode SE according to a control signal from the sensor control unit 37. When the drive signal is applied, the switch 323 switches the path between the sensor driver 32 and each sensor electrode SE to a path connecting the drive signal application unit 321 and each sensor electrode SE.

The charge amount detection unit 322 detects the amount of charge accumulated in each sensor electrode SE when the drive signal is applied. At the time of detecting the charge amount, the switch 323 switches a path between the sensor driver 32 and each sensor electrode SE to a path connecting the charge amount detection unit 322 and each sensor electrode SE. The sensor control unit 37 acquires the charge amount of each sensor electrode SE detected by the charge amount detection unit 322 as a detection value, and outputs the acquired charge amount to the determination unit 39.

The determination unit 39 determines whether the detection value of each sensor electrode SE with respect to the drive signal meets a predetermined determination criterion. In the fourth embodiment, the determination criterion is a criterion indicating that the potential difference between both ends of the parasitic capacitance C1 or C2 formed in the sensor electrode SE has decreased due to a short-circuit.

More specifically, the parasitic capacitance C1 or C2 is formed between each sensor electrode SE and the gate line GL and data line DL to which a constant potential is applied. When the short-circuit has not occurred, the potential difference between both ends of parasitic capacitance C1 or C2 becomes a difference between a constant potential applied to the gate line GL and data line DL and a potential (for example, 5 V) of the drive signal applied to the sensor electrode SE (in the example of FIG. 23, −12 V, −4.8 V, and 5.2 V).

Here, as illustrated in FIG. 23, when a short-circuit occurs between the gate line GL and data line DL, electric charges flow between the short-circuited lines, so that potentials become the same between the short-circuited lines. In the example of FIG. 23, the potentials of the short-circuited gate line GL and data line DL become 1.6 V which is an intermediate potential between −7 V and 10.2 V which are the respective potentials before the short-circuiting. As a result, the absolute value of the potential difference (−3.4 V in the example of FIG. 23) between the short-circuited gate line GL and data line DL and the sensor electrode SE decreases as compared with the absolute value of the potential difference (in the example of FIG. 23, −12 V, −4.8 V, and 5.2 V) between non-short-circuited gate line GL and data line DL and the sensor electrode SE.

Similarly, when a short-circuit occurs between the gate line GL and the COM electrode and when a short-circuit occurs between the data line DL and the COM electrode, the absolute value of the potential difference between the short-circuited line and the sensor electrode SE decreases.

The determination unit 39 determines whether the potential difference between both ends of the parasitic capacitance C1 or C2 formed in each sensor electrode SE has decreased based on the charge amount detected from each sensor electrode SE when the drive signal is applied. Specifically, the determination unit 39 determines whether the potential difference between both ends of the parasitic capacitance C1 or C2 formed in each sensor electrode SE is relatively reduced as compared with the normal state or as compared with the potential difference between both ends of the parasitic capacitance C1 or C2 formed in another sensor electrode SE. Then, when the potential difference between both ends of the parasitic capacitance C1 or C2 formed in the sensor electrode SE in which the charge amount is detected decreases, the determination unit 39 determines that the charge amount meets the determination criterion.

Specifically, the determination unit 39 monitors the charge amount of each sensor electrode SE in a case where the drive signal is applied. Then, the determination unit 39 measures the discharge time of each sensor electrode SE, specifically, the time during which the charge amount of each sensor electrode SE in a case where the drive signal is applied decreases from the peak value to a predetermined threshold or less.

FIG. 25 illustrates a waveform of a charge amount of the sensor electrode SE in a case where a drive signal (a rectangular pulse signal indicated by a solid line) is applied to the sensor electrode SE. In FIG. 25, the waveform of the charge amount of the sensor electrode SE in the normal state, that is, when no short-circuit occurs is indicated by a dotted line. In addition, a waveform of the charge amount of the sensor electrode SE in a case where a short-circuit occurs between different types of lines is indicated by a broken line.

When a short-circuit occurs between different types of lines, the potential difference between the parasitic capacitances C1 and C2 formed in the sensor electrode SE decreases as compared with the normal state. Since the amount of charge accumulated in the sensor electrode SE is represented by the product ($Q=C \times V$) of the parasitic capacitance and the potential difference, when the potential difference decreases, the amount of charge decreases accordingly. Therefore, when a short-circuit occurs between different types of lines, the charge time and the discharge time by the drive signal are shorter than those in the normal state.

For each sensor electrode SE, the determination unit 39 determines whether such a discharge time is equal to or less than a predetermined determination value (fourth determination value). Then, when the discharge time is equal to or less than the determination value, the determination unit 39 determines that the potential difference between both ends of the parasitic capacitance C1 or C2 has decreased, and determines that the detection value (charge amount) meets the determination criterion.

In a case where there are the sensor electrodes SE whose detection values meet the determination criterion as described above, the determination unit 39 determines whether the sensor electrodes SE are linearly distributed as in the first embodiment. When two or more sensor electrodes SE whose detection values meet the determination criterion are distributed linearly, the determination unit 39 determines that a short-circuit occurs in the gate line GL or data line DL facing the sensor electrodes SE distributed linearly. Specifically, the determination unit 39 detects, as the short-circuit, a short-circuit between different types of lines, that is, a short-circuit between the gate line GL and data line DL, a short-circuit between the gate line GL and the COM electrode, and a short-circuit between the data line DL and the COM electrode.

As described above, the liquid crystal display device 10 according to the fourth embodiment applies a drive signal to each sensor electrode SE, and determines whether the potential difference between both ends of the parasitic capacitance C1 or C2 has decreased based on the charge amount detected from each sensor electrode SE at that time. In this way, it is possible to detect a short-circuit between different types of lines occurred in the liquid crystal panel 20.

<Modification>

Although the embodiments of the present disclosure have been described above, the present disclosure is not limited to the embodiments. The embodiments can be combined, and the embodiments can be appropriately modified or omitted.

For example, in the first to third embodiments, the determination unit 39 acquires the voltage value as the detection value detected from each sensor electrode SE when the drive signal is applied in the touch detection process and the line defect determination process, and determines the presence of the touch and the line defect based on the charge time in each sensor electrode SE. However, the determination unit 39 may use an index other than the charge time as long as the change in the parasitic capacitance formed in each sensor electrode SE can be detected. For example, the determination unit 39 may determine the presence of a touch and a line defect based on the discharge time in each sensor electrode SE. Alternatively, the sensor control unit 37 may acquire, as the detection value of each sensor electrode SE, an amount of current flowing through the sensor electrode SE when a drive pulse is applied to the sensor electrode SE, instead of the voltage value. Then, the determination unit 39 may determine the presence of the touch and the line defect based on the current amount. Furthermore, for example, the capacitance detection method disclosed in JP 6615683 B, JP 2019-211898 A, or the like may be applied to the touch detection process and the line defect determination process in the present disclosure.

In the above embodiment, the liquid crystal panel 20 has been described as an in-cell touch panel. However, the liquid crystal panel 20 is not limited to the in-cell touch panel as long as a parasitic capacitance is formed between the sensor electrode SE and the liquid crystal drive line, and may be, for example, an on-cell touch panel. In addition, it goes without saying that the touch detection process can be omitted if the purpose is only to detect and discriminate line defects.

In the above embodiment, the sensor electrodes SE are arranged on the side where the data line DL, gate line GL, and TFT are arranged. In the case of such an arrangement configuration, for example, in the case of a liquid crystal panel adopting a horizontal electric field system such as a fringe field switching (FFS) mode, since the common electrode is arranged on the substrate side on which the TFT is arranged, the common electrode can be used as the sensor electrode SE.

The method for detecting a line defect described in the above embodiments is applicable not only to a liquid crystal display device but also to an organic EL display device or the like. For example, it is also possible to arrange the sensor electrode SE using an indium tin oxide (ITO) or the like in a base layer portion of the TFT substrate, or to arrange the sensor electrode SE in a planarization layer formed between the TFT forming layer and the EL light emitting layer.

In the above embodiment, in the control unit 33, the CPU executes the program stored in the ROM, thereby functioning as each unit of the liquid crystal control unit 35, the sensor control unit 37, and the determination unit 39. However, the control unit 33 may include dedicated hardware such as an application specific integrated circuit (ASIC), a field-programmable gate array (FPGA), and various control circuits instead of the CPU, and the dedicated hardware may function as each of the liquid crystal control unit 35, the sensor control unit 37, and the determination unit 39. In this case, the functions of the respective units may be realized by individual hardware, or the functions of the respective units may be collectively realized by single hardware. In addition, some of the functions of the respective units may be implemented by dedicated hardware, and other functions may be implemented by software or firmware.

The present disclosure enables various embodiments and modifications without departing from the broad spirit and scope of the present disclosure. In addition, the above-described embodiments are for describing the present disclosure, and do not limit the scope of the present disclosure. That is, the scope of the present disclosure is defined by the claims rather than the embodiments. Various modifications made within the scope of the claims and within the meaning of the equivalent disclosure are then considered to be within the scope of this disclosure.

What is claimed is:

1. A liquid crystal display device comprising:
a liquid crystal panel; and
a driver that drives the liquid crystal panel,
wherein the liquid crystal panel includes:
a plurality of sensor electrodes arranged in a matrix form for detecting a touch on the liquid crystal panel; and
a plurality of liquid crystal drive lines configured to display an image on the liquid crystal panel,
wherein the driver includes:
a control unit configured to execute a display process of displaying the image on the liquid crystal panel, a touch detection process of detecting the touch on the liquid crystal panel, and a line defect determination process of determining presence of a line defect in the liquid crystal panel, and wherein in the line defect determination process, the control unit applies a drive signal to each of the sensor electrodes, determines whether a detection value detected from each of the sensor electrodes when the drive signal is applied meets a predetermined determination criterion, and determines that the line defect has occurred when the sensor electrodes whose detection values meet the determination criterion among the plurality of sensor electrodes are linearly distributed.

2. The liquid crystal display device according to claim 1, wherein in the line defect determination process, the control unit applies the drive signal to each of the sensor electrodes when a constant potential is applied to each of the liquid crystal drive lines, and determines that a disconnection has occurred in the liquid crystal drive lines facing the sensor electrodes linearly distributed as the line defect when the sensor electrodes whose detection values meet the determination criterion are linearly distributed.

3. The liquid crystal display device according to claim 2, wherein in the touch detection process, the control unit applies the drive signal to each of the sensor electrodes when a constant potential is applied to each of the liquid crystal drive lines, and detects the touch based on a detection value detected from each of the sensor electrodes when the drive signal is applied, and
wherein a difference between a potential applied to a plurality of data lines among the plurality of liquid crystal drive lines and a potential of the drive signal in the line defect determination process is larger than a difference between a potential applied to the plurality of data lines and a potential of the drive signal in the touch detection process.

4. The liquid crystal display device according to claim 2, wherein the control unit determines that the detection value meets the determination criterion in a case where that it is determined that the parasitic capacitance formed in the sensor electrode where the detection value is detected has decreased based on the detection value in the line defect determination process.

5. The liquid crystal display device according to claim 1, wherein in the line defect determination process, the control unit varies a potential of one liquid crystal drive line of the plurality of liquid crystal drive lines at a timing synchronized with the drive signal, determines whether the detection value of the sensor electrodes facing the one liquid crystal drive line at the timing meets the determination criterion, and executes, for each of the liquid crystal drive lines, an individual determination process of determining that a disconnection or a short-circuit has occurred in the one liquid crystal drive line as the line defect when the sensor electrodes whose detection values meet the determination criterion are linearly distributed.

6. The liquid crystal display device according to claim 5, wherein the control unit determines that the detection value meets the determination criterion when a variation amount of the detection value at the timing is equal to or less than a predetermined determination value in the individual determination process.

7. The liquid crystal display device according to claim 1, wherein the control unit applies a drive signal to each of the sensor electrodes when every other liquid crystal drive line among the plurality of liquid crystal drive lines is in a high-impedance state in the line defect determination process, and determines that a short-circuit between lines of the same type occurs as the line defect in the liquid crystal drive line facing the sensor electrodes distributed linearly when the sensor electrodes whose detection values meet the determination criterion are distributed linearly.

8. The liquid crystal display device according to claim 7, wherein the control unit determines that the detection value meets the determination criterion in a case where that it is determined that the parasitic capacitance formed in the sensor electrode in which the detection value is detected has increased based on the detection value in the line defect determination process.

9. The liquid crystal display device according to claim 1, wherein
the control unit determines that the detection value meets the determination criterion in a case where that it is determined that the potential difference between both ends of the parasitic capacitance formed in the sensor electrode in which the detection value is detected has decreased based on the detection value in the line defect determination process, and determines that a short-circuit between different types of lines has occurred in the liquid crystal drive line facing the sensor electrodes distributed linearly as the line defect when the sensor electrodes whose detection values meet the determination criterion are distributed linearly.

10. The liquid crystal display device according to claim 9, wherein
the control unit detects a charge amount of each of the sensor electrodes when the drive signal is applied as the detection value in the line defect determination process.

11. A line defect detection method of detecting a line defect in a liquid crystal display device, the liquid crystal display device includes a plurality of sensor electrodes arranged in a matrix form and a plurality of liquid crystal drive lines, the method comprising:
applying a drive signal to each of the sensor electrodes;
determining whether a detection value detected from each of the sensor electrodes when the drive signal is applied meets a predetermined determination criterion; and
determining that the line defect has occurred when the sensor electrodes whose detection values meet the determination criterion among the plurality of sensor electrodes are linearly distributed.

* * * * *